(12) United States Patent
Kishore et al.

(10) Patent No.: US 10,372,492 B2
(45) Date of Patent: Aug. 6, 2019

(54) JOB-PROCESSING SYSTEMS AND METHODS WITH INFERRED DEPENDENCIES BETWEEN JOBS

(71) Applicant: Dropbox, Inc., San Francisco, CA (US)

(72) Inventors: Shaunak Kishore, San Francisco, CA (US); Karl Dray, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 345 days.

(21) Appl. No.: 14/103,671

(22) Filed: Dec. 11, 2013

(65) Prior Publication Data

US 2015/0160974 A1    Jun. 11, 2015

(51) Int. Cl.
*G06F 9/48* (2006.01)

(52) U.S. Cl.
CPC .................. *G06F 9/4881* (2013.01)

(58) Field of Classification Search
CPC .................. G06F 9/4881; G06F 9/52
See application file for complete search history.

(56) References Cited

U.S. PATENT DOCUMENTS

| | | | |
|---|---|---|---|
| 5,347,646 A | 9/1994 | Hirosawa et al. | |
| 6,401,223 B1 | 6/2002 | DePenning | |
| 6,714,961 B1 | 3/2004 | Holmberg et al. | |
| 7,093,004 B2* | 8/2006 | Bernardin | G06F 9/505 |
| | | | 707/999.1 |
| 7,406,469 B1 | 7/2008 | Thiyagarajan | |
| 7,650,331 B1* | 1/2010 | Dean | G06F 9/5066 |
| | | | 712/203 |
| 8,108,878 B1 | 1/2012 | Pulsipher | |
| 8,122,453 B2* | 2/2012 | Trossman | G06F 9/50 |
| | | | 706/14 |
| 8,136,104 B2* | 3/2012 | Papakipos | G06F 8/20 |
| | | | 717/136 |
| 8,181,180 B1 | 5/2012 | Anderson et al. | |
| 8,364,647 B1* | 1/2013 | Eastlund | G06Q 30/02 |
| | | | 707/666 |

(Continued)

OTHER PUBLICATIONS

"Azkaban and Pig at LinkedIn," by Russell Jurney, Aug. 26, 2010, [online], [retrieved on Jan. 13, 2014], retrieved from the Internet: <URL:http://www.slideshare.net/rjurney/azkaban-pig-5057793>, 9 pages.

(Continued)

*Primary Examiner* — Emerson C Puente
*Assistant Examiner* — Zhi Chen
(74) *Attorney, Agent, or Firm* — Hickman Palermo Becker Bingham LLP

(57) ABSTRACT

An analytics system that executes processing jobs infers dependencies between jobs to be executed based on identification of dependencies between a "sink" job and a source data object on which the sink job depends. Given a job definition for the sink job that identifies a source data object, the system can identify a "source" job that produces the source data object and can infer a dependency of the sink job on the source job. The system can schedule executions of the source and sink jobs such that the source job completes (or completes generation of the source data object) before the sink job is launched.

15 Claims, 13 Drawing Sheets

(56) References Cited

U.S. PATENT DOCUMENTS

| | | | |
|---|---|---|---|
| 8,561,187 B1* | 10/2013 | Hegli | H04L 63/1491 726/22 |
| 8,732,118 B1* | 5/2014 | Cole | G06F 17/30563 707/600 |
| 8,812,752 B1* | 8/2014 | Shih | G06F 9/542 710/29 |
| 8,924,974 B1* | 12/2014 | Ruggiero | G06F 9/466 707/643 |
| 9,595,014 B1* | 3/2017 | Vohra | G06Q 10/10 |
| 2003/0120708 A1* | 6/2003 | Pulsipher | G06F 9/4881 718/106 |
| 2003/0120709 A1 | 6/2003 | Pulsipher | |
| 2003/0120710 A1 | 6/2003 | Pulsipher | |
| 2004/0025163 A1 | 2/2004 | Babutzka | |
| 2004/0136613 A1* | 7/2004 | Menger | G06F 9/5066 382/304 |
| 2004/0172634 A1* | 9/2004 | Honda | G06F 9/45512 718/104 |
| 2005/0015437 A1 | 1/2005 | Strait | |
| 2008/0189775 A1 | 8/2008 | Fujita | |
| 2008/0244565 A1* | 10/2008 | Levidow | G06F 9/5038 717/176 |
| 2011/0066496 A1* | 3/2011 | Zhang | G06F 17/30867 705/14.53 |
| 2011/0154341 A1* | 6/2011 | Pueyo | G06F 9/5066 718/101 |
| 2011/0179171 A1* | 7/2011 | Gusev | G06F 9/5061 709/226 |
| 2011/0276968 A1* | 11/2011 | Kand | G06F 9/5038 718/102 |
| 2011/0302285 A1* | 12/2011 | D'Angelo | G06F 16/958 709/222 |
| 2012/0060165 A1* | 3/2012 | Clarke | G06F 9/5038 718/104 |
| 2012/0144017 A1* | 6/2012 | Singh | G06F 1/3206 709/224 |
| 2012/0167101 A1* | 6/2012 | Kandula | H04L 67/325 718/102 |
| 2012/0278323 A1* | 11/2012 | Chattopadhyay | G06F 17/30545 707/737 |
| 2013/0262835 A1* | 10/2013 | Arakawa | G06F 8/445 712/220 |
| 2013/0345999 A1* | 12/2013 | Hafen | G01R 21/133 702/60 |
| 2014/0032528 A1* | 1/2014 | Mandre | G06F 17/30463 707/718 |
| 2014/0229953 A1* | 8/2014 | Sevastiyanov | G06F 9/4881 718/102 |
| 2014/0282605 A1 | 9/2014 | Jacobson et al. | |
| 2014/0310047 A1* | 10/2014 | De | G06Q 10/103 705/7.21 |
| 2015/0160974 A1 | 6/2015 | Kishore et al. | |

OTHER PUBLICATIONS

Globant.com, "Azkaban overview," [online], [retrieved on Jan. 13, 2014], retrieved from the Internet: <URL:http://bigdata.globant.com/?p=441>, 3 pages.

LinkedIn.com, "Azkaban," [online], [retrieved on Jan. 13, 2014], retrieved from the Internet: <URL:http://data.linkedin.com/opensource/azkaban>, 2 pages.

Qubole.com, "Apache Oozie as a Service," [online], [retrieved on Jan. 13, 2014], retrieved from the Internet: <URL:http://www.qubole.com/articles/apache-oozie-as-a-service/>, 2 pages.

"Oozie, Yahoo! Workflow Engine for Hadoop," The Apache Software Foundation, Feb. 29, 2012, [online], [retrieved on Jan. 13, 2014], retrieved from the Internet: <URL:https://oozie.apache.org/docs/3.1.3-incubating/>, 2 pages.

"Oozie Workflow Overview," The Apache Software Foundation, Feb. 29, 2012, [online], [retrieved on Jan. 13, 2014], retrieved from the Internet: <URL:https://oozie.apache.org/docs/3.1.3-incubating/DG_Overview.html, 2 pages.

"Oozie Specification, a Hadoop Workflow System," The Apache Software Foundation, Feb. 29, 2012, [online], [retrieved on Jan. 13, 2014], retrieved from the Internet: <URL:https://oozie.apache.org/docs/3.1.3-incubating/WorkflowFunctionalSpec.html>, 34 pages.

U.S. Appl. No. 14/103,683, filed Dec. 11, 2013, Office Action, dated Oct. 19, 2015.

U.S. Appl. No. 14/103,683, filed Dec. 11, 2013, Notice of Allowance, dated Aug. 3, 2016.

U.S. Appl. No. 14/103,683, filed Dec. 11, 2013, Final Office Action, dated Feb. 22, 2016.

\* cited by examiner

JOB-PROCESSING SYSTEMS AND METHODS WITH INFERRED DEPENDENCIES BETWEEN JOBS

CROSS-REFERENCES TO RELATED APPLICATIONS

This application is related to and incorporates by reference for all purposes the full disclosure of co-pending U.S. patent application Ser. No. 14/103,683, filed Dec. 11, 2013, entitled "Automated Invalidation of Job Output Data in a Job-Processing System."

BACKGROUND

The present disclosure relates generally to job-processing computer systems and in particular to job-processing systems and methods with inferred dependencies between jobs.

Large-scale data analysis can help businesses achieve various goals. For example, online services continue to proliferate, including social networking services, online content management services, file-sharing services, and the like. Many of these services are supported by large-scale computing systems including server farms, network storage systems and the like. Making sure the resources are matched to current and future user demand is an important part of efficiently managing an online service, and analysis of large quantities of data can help the service provider understand and anticipate trends in demand. As another example, sales or advertising businesses may amass customer data such as who visits which websites, for how long, and whether or what they purchase. Making use of this data, e.g., to develop or revise a marketing strategy, requires processing large quantities of data.

Analytics systems have emerged as a tool to help businesses analyze large quantities of data. Such systems can provide automated processes for generating reports that provide various windows into customer behavior. For instance, in a typical online-service environment, collected data (such as user activity logs) can be stored in a data warehouse. The collected data can be processed using distributed computing techniques to generate reports that can be delivered to executives, system managers, and/or others within the online-service provider's organization. These reports can guide decision processes, such as adding new capacity or developing or enhancing service offerings.

Analytics systems depend on data and data availability. Data for reports can come from "raw" data, such as logs of user activity, or previously processed data and can be processed through a series of processing jobs defined by an operator of the analytics system (also referred to as an "analyst"). For instance, a report on system usage patterns may be created by running a first job to process a log of user activity to identify all user identifiers that logged in at least once in a 24-hour period, then running a second job to group the user identifiers according to some metric of interest (e.g., demographics, geographic location, etc.). Such a report would depend on availability of user login and logout data (the activity log). If the login/logout data is not available, the report can be delayed, be incorrect or fail to be created.

SUMMARY

Certain embodiments of the present invention relate to analytics systems that allow the analysts to define or control the order in which processing jobs are executed, so that data is produced before it is consumed. For instance, an analyst can define a dependency between a job and the source data on which the job depends. In some embodiments, dependencies of a job that consumes data (referred to herein as a "sink" job or "consumer" job) can be specified by one or more "source" data objects (the term "data object" can include any defined data set, such as a data table or data file) within the analytics system on which the sink job depends. The system can automatically determine which job (or multiple jobs as the case may be) is a "source" job (also referred to herein as a "producer" job) responsible for generating the source data object and can infer a dependency of the sink job on the source job. The system can schedule jobs such that each source job completes (or completes generation of the source data object) before a sink job is launched.

Specifying dependencies on data objects rather than jobs can simplify the analyst's task. For example, the analyst defining a job that consumes data from a particular source data object does not need to know which job (or jobs) produce the source data object; the analyst can simply indicate that the source data object needs to be up-to-date before the consumer job is run. The analytics system can enforce this condition, e.g., by inferring which source job (or jobs) need to run to produce the data and making sure that the source job runs to completion (which can be but need not be successful completion) before the starting the sink job.

The following detailed description together with accompanying drawings, will provide a better understanding of the nature and advantages of the present invention.

DETAILED DESCRIPTION

Certain embodiments of the present invention relate to analytics systems that allow the analysts to define or control the order in which processing jobs are executed, so that data is produced before it is consumed. For instance, an analyst can define a dependency between a job and the source data on which the job depends. In some embodiments, dependencies of a job that consumes data (referred to herein as a "sink" job or "consumer" job) can be specified by identifying one or more "source" data objects (the term "data object" can include any defined data set, such as a data table or data file) within the analytics system on which the sink job depends. The system can automatically determine which job (or multiple jobs as the case may be) is a "source" job (also referred to herein as a "producer" job) responsible for generating the source data object and can infer a dependency of the sink job on the source job. The system can schedule jobs such that each source job completes (or completes generation of the source data object) before a sink job is launched.

Specifying dependencies on data objects rather than jobs can simplify the analyst's task. For example, the analyst defining a job that consumes data from a particular source data object does not need to know which job (or jobs) produce the source data object; the analyst can simply indicate that the source data object needs to be up-to-date before the consumer job is run. The analytics system can enforce this condition, e.g., by inferring which source job (or jobs) need to run to produce the data and making sure that the source job runs to completion (which can be but need not be successful completion) before the starting the sink job.

Figure 1:
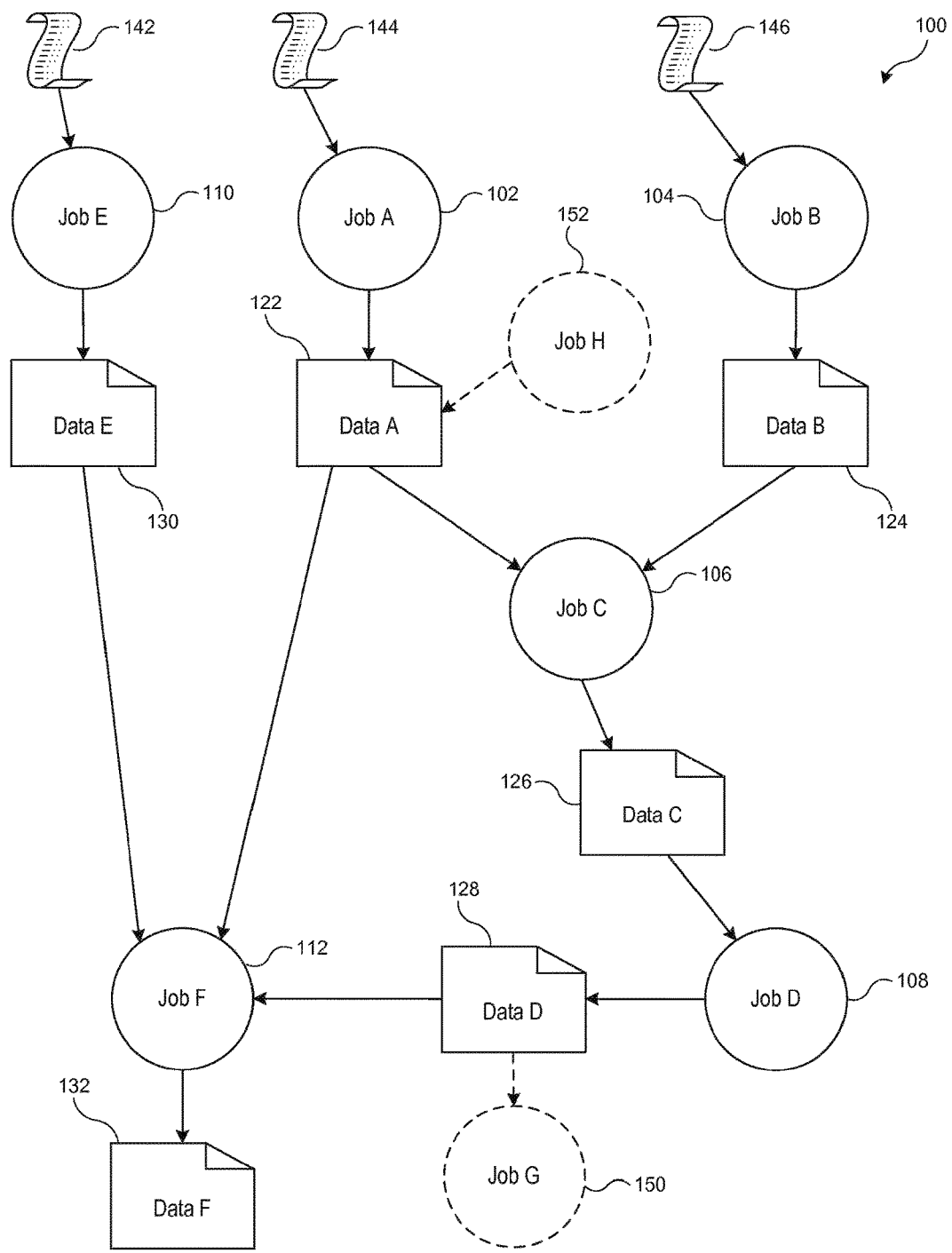
FIG. 1 shows an example of dependency definitions according to an embodiment of the present invention.

FIG. 1 shows an example of dependency definitions according to an embodiment of the present invention. As shown, an analytics system may execute a number of jobs, including job A 102, job B 104, job C 106, job D 108, job E 110, and job F 112. A "job" as used herein can include any defined and scheduled processing task that performs an operation (or a sequence of operations) on source data to produce output data. In the example shown, each job produces a corresponding output data object: job A 102 produces data A 122; job B 104 produces data B 124; job C 106 produces data C 126; job D 108 produces data D 128; job E 110 produces data E 130; and job F 112 produces data F 132. Although not shown in FIG. 1, in some instances, a single job can produce multiple data objects.

Data consumed and/or produced by the various jobs can include any type of data or information available to or within an analytics system. For instance, jobs A 102, B 104 and E 110 can be jobs that operate on "raw" input data such as user activity logs 142, 144, 146. Jobs A 102, B 104, and E 110 can perform different operations on the same input data or the same operations on different input data or different operations on different input data as desired. Job C 106 consumes data A 122 that is produced by job A 102 and data B 124 that is produced by job B 104. Data C 126 is produced by job C 106 and consumed by job D 108. Thus, job C 106 is a "sink" job (or consumer) in relation to jobs A 102 and B 104 but a "source" job (or producer) in relation to job D 108.

The output data from different jobs can be in different formats. For example, in one embodiment, job A 102 can produce a database table that includes selected information from the log, such as a deduplicated list of all user identifiers appearing in the log; data A 122 can represent the database table. In the same embodiment, job F 112 can process the user list of data A 122 together with additional inputs and produce a user-readable report as data F 132.

As shown in FIG. 1, multiple jobs can consume the same source data. For example, data A 122 is consumed by job C 106 and by job F 112. Likewise, a single job can be a sink for one or more data sources. For example, job D 108 has one data source, data C 126. Job C 106 has two data sources, data A 122 and data B 124. Job F 112 has three data sources, data A 122, data D 128, and data E 130. Thus, one source job can produce data for any number of sink jobs, and a job can be a sink job for any number of data sources.

For purposes of correctly executing all of the jobs in FIG. 1, a scheduling system can be used to make sure that jobs are executed in the correct order, which can be any order subject to the condition that a job that produces a data object completes execution (or at least completes production of the data object) before any job that consumes that data object begins execution (or at least begins consumption of the data object). Thus, for example, a scheduling system can require that jobs A 102 and B 104 be completed before job C 106 begins. Jobs A 102 and B 104 can execute in any order, or concurrently, since neither depends on data generated by the other. In some systems, e.g., as described below, the scheduling system can identify jobs that are ready to execute and can dispatch the jobs to a computing cluster for execution. Upon completion of a job, the computing cluster can inform the scheduling system, which can then determine which job (or jobs) to dispatch next.

In accordance with certain embodiments of the present invention, defining a job to be executed by an analytics system can include specifying a name for each data object to be produced by the job and the name of each data object to be consumed by the job. Thus, for example, an analyst defining job C 106 can specify that job C 106 consumes data A 122 and data B 124 and produces data C 126. From this information, the analytics system can infer that the jobs that produce data A 122 and data B 124 should execute before job C 106. Further, because the definition of job A 102 specifies that job A produces data A 122 and the definition of job B 104 specifies that job B produces data 124, the analytics system can determine that the jobs that should execute before job C 106 are jobs A 102 and B 104.

Where the analytics system infers dependencies among jobs from the data dependencies, the analyst can define a job that consumes data and have it correctly inserted into the dependency structure without having to determine which job (or jobs) generate the data that is to be consumed. For example, an analyst might define job G 150 (dashed lines) as a new job that consumes data D 128; as long as the analyst knows that data D 128 is being created, the analyst does not need to know that job D 108 is the creator, or what dependencies job D 108 has on any other jobs.

Further, if the source job (or jobs) for a particular data object are redefined, the dependency structure can be updated without altering the definitions of downstream jobs. For example, an analyst might define job H 152 (dashed lines) as a new job that produces additional data that becomes part of data A 122 (a specific example is given below). The definitions of consumer jobs C 106 and F 112 need not be affected, as they continue to consume data A 122, regardless of the source of the data.

It will be appreciated that the dependency structure of FIG. 1 is illustrative and that variations and modifications are possible. A processing job can be defined as desired and can include any number, type, and combination of data-processing operations. For example, a processing job may perform database operations such as creating a data table in a database from a structured input file (e.g., an event log), querying a database or data table, performing database operations on data tables (e.g., merge, join, deduplicate), performing arithmetic or statistical computations (e.g., sum, difference, average, median, standard deviation, correlations), and so on. A job can produce one or more output data objects and can consume one or more input data objects, and a given job can depend on or be depended on by any number of other jobs. In some systems, dozens or hundreds of discrete jobs can be defined, with some jobs depending on earlier jobs that in turn depend on still earlier jobs.

Figure 2:
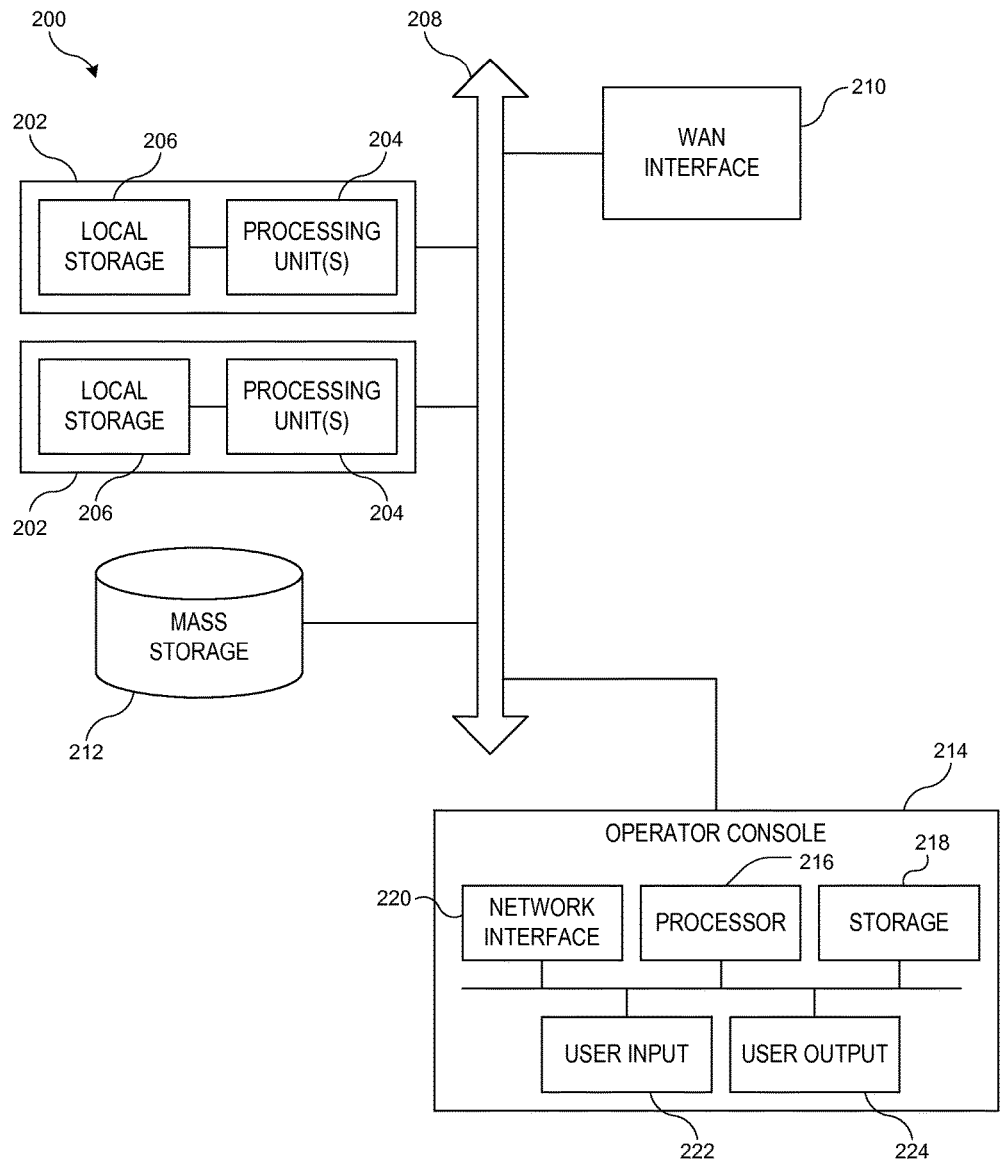
FIG. 2 shows a server system that can be used to implement aspects of an analytics system in a distributed-computing architecture according to an embodiment of the present invention.

Job execution with dependency-based scheduling can be implemented in a variety of standalone computer systems and/or distributed-computing architectures. FIG. 2 shows a server system 200 that can be used to implement an analytics system (or aspects thereof) in a distributed-computing architecture according to an embodiment of the present invention.

Server system 200 can have a modular design that incorporates a number of modules 202 (e.g., blades in a blade server implementation); while two modules 202 are shown, any number can be provided. Each module 202 can include processing unit(s) 204 and local storage 206.

Processing unit(s) 204 can include a single processor, which can have one or more cores, or multiple processors. In some embodiments, processing unit(s) 204 can include a general-purpose primary processor as well as one or more special-purpose co-processors such as graphics processors, digital signal processors, or the like. In some embodiments, some or all processing units 304 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 204 can execute instructions stored in local storage 206. Any type of processors in any combination can be included in processing unit(s) 204.

Local storage 206 can include volatile storage media (e.g., conventional DRAM, SRAM, SDRAM, or the like) and/or non-volatile storage media (e.g., magnetic or optical disk, flash memory, or the like). Storage media incorporated in local storage 206 can be fixed, removable or upgradeable as desired. Local storage 206 can be physically or logically divided into various subunits such as a system memory, a read-only memory (ROM), and a permanent storage device. System memory can include a read-and-write memory device, e.g., a volatile read-and-write memory, such as dynamic random access memory, and can store some or all of the instructions and data that processing unit(s) 204 need at runtime. ROM can store static data and instructions that are needed by processing unit(s) 206. Permanent storage devices can include a non-volatile read-and-write memory device, e.g., flash memory or magnetic disk, and can store instructions and data even when module 202 is powered down. The term "storage medium" as used herein includes any medium in which data can be stored indefinitely (subject to overwriting, electrical disturbance, power loss, or the like) and does not include carrier waves and transitory electronic signals passing wirelessly or over wired connections.

In some embodiments, local storage 206 can store one or more software programs to be executed by processing unit(s) 204, such as an operating system and/or programs implementing various functions, such as execution of all or part of a processing job or other processes as described herein. "Software" refers generally to sequences of instructions that, when executed by processing unit(s) 204 cause server system 200 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 204. Software can be implemented as a single program or a collection of separate programs or program modules that interact as desired. From local storage 206 (or non-local storage described below), processing unit(s) 204 can retrieve program instructions to execute and data to process in order to execute various operations described herein.

In some server systems 200, multiple modules 202 can be interconnected via a bus 208, forming a local area network that supports communication between modules 202 and other components of server system 200. Bus 208 can be implemented using various technologies including server racks, hubs, routers, etc.

A wide area network (WAN) interface 210 can provide data communication capability between the local area network (bus 208) and a larger network, such as the Internet. Conventional or other communications technologies can be used, including wired (e.g., Ethernet, IEEE 802.3 standards) and/or wireless technologies (e.g., Wi-Fi, IEEE 802.11 standards).

In some embodiments, local storage 206 is intended to provide working memory for processing unit(s) 204, providing fast access to programs and/or data to be processed while reducing traffic on bus 208. Storage for larger quantities of data can be provided on the local area network by one or more mass storage subsystems 212 that can be connected to bus 208. Mass storage subsystem 212 can be based on magnetic, optical, semiconductor, or other data storage technologies. Direct attached storage, storage area networks, network-attached storage, and the like can be used. Any data stores or other collections of data described herein as being produced or consumed by servers can be stored in mass storage subsystem 212. In some embodiments, additional data storage resources may be accessible via WAN interface 210 (potentially with somewhat increased latency). Mass storage subsystem 212 can be used to store user activity logs, one or more databases that can include various data tables, and/or other large data objects, examples of which are described below.

In some embodiments, server system 200 can operate in response to requests received via WAN interface 210. For example, one of modules 202 can implement a supervisory function and assign discrete tasks to other modules 202 in response to received requests. Conventional work allocation techniques can be used. As requests are processed, results can be returned to the requester via WAN interface 210. Such operation can generally be automated. Further, in some embodiments, WAN interface 210 can connect multiple server systems 200 to each other, providing scalable solutions capable of managing high volumes of activity. Thus, a distributed computing architecture can be distributed across any number of physical computer systems without geographic constraint. Conventional or other techniques for managing server systems and server farms (collections of server systems that cooperate) can be used, including dynamic resource allocation and reallocation.

In some embodiments, operator console 214 can be provided to allow a system operator or administrator to interact directly with server system 200, e.g., for purposes of monitoring, testing, troubleshooting, upgrading, or the like, as well as for purposes of allowing analysts to define jobs and/or update job definitions. Operator console 214 can include conventional computer components such as a processor 216, storage device 218, network interface 220, user input device 222, and user output device 224. In some embodiments, operator console 214 can be physically remote from the rest of server system 200 and can be connected via WAN interface 210.

Processor 216 and storage device 218 can be similar to processing unit(s) 204 and local storage 206 described above. Suitable devices can be selected based on the demands to be placed on operator console 214; for example, console 214 can be implemented as a "thin" client with limited processing capability. Network interface 220 can provide a connection to bus 208 and/or directly to a WAN. User input device 222 can include any device (or devices) via which a user can provide signals to console 214; console 214 can interpret the signals as indicative of particular user requests or information. In various embodiments, user input device 222 can include any or all of a keyboard, touch pad, touch screen, mouse or other pointing device, scroll wheel, click wheel, dial, button, switch, keypad, microphone, and so on.

User output device 224 can include any device via which console 214 can provide information to a user. For example, user output device 224 can include a display to display images generated by or delivered to console 214. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 224 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 204 can provide various functionality for server system 200, including any of the functionality described herein as being performed by a server, analytics system, or distributed processing system.

It will be appreciated that server system 200 is illustrative and that variations and modifications are possible. Server system 200 can have other capabilities not specifically described here. Further, while server system 200 is described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 3:
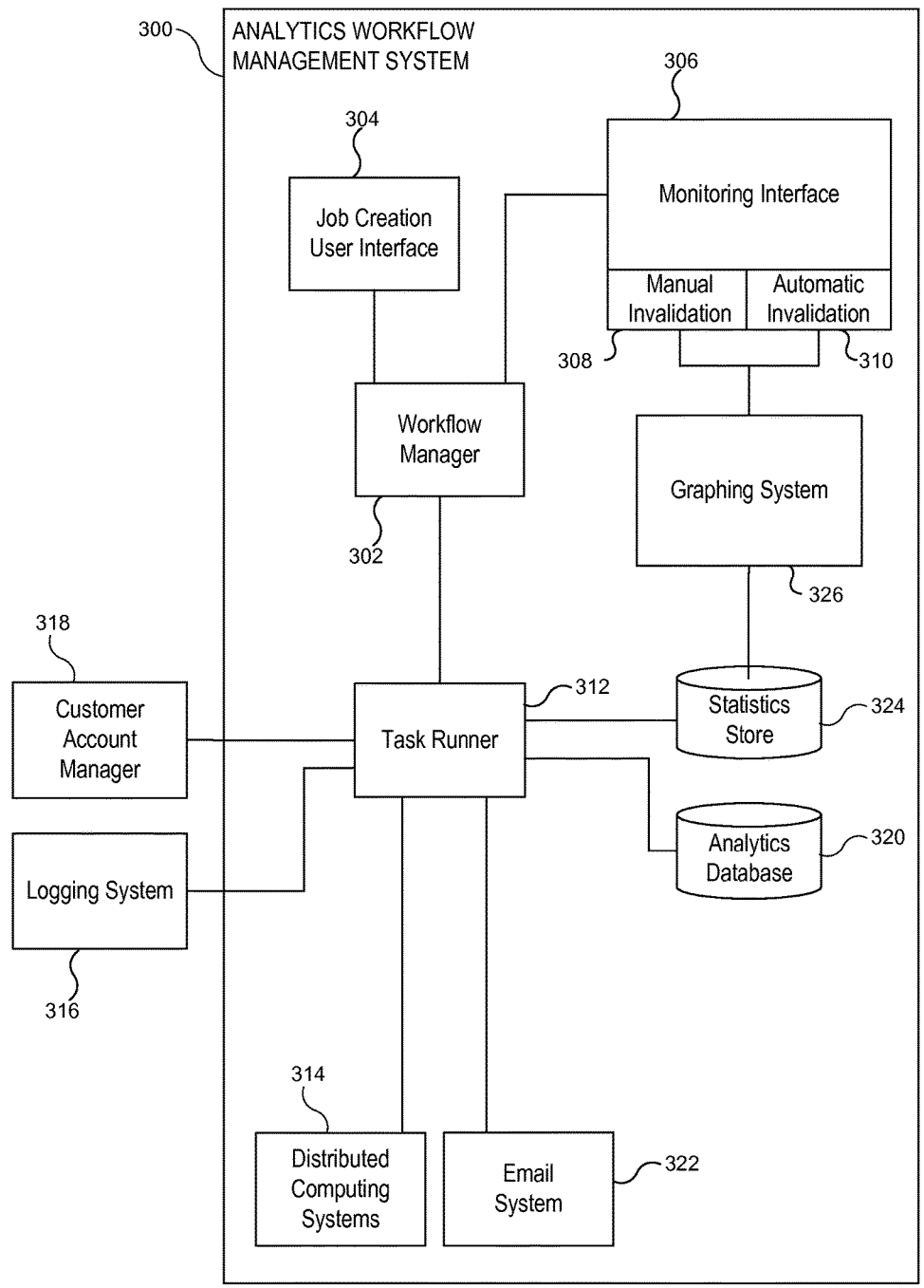
FIG. 3 shows a simplified block diagram of an analytics workflow management system according to an embodiment of the present invention.

In some embodiments, system 200 can implement an analytics workflow management system that can schedule jobs based on inferred dependencies. FIG. 3 shows a simplified block diagram of an analytics workflow management system 300 according to an embodiment of the present invention. System 300 can include various functional blocks or modules that can be implemented, e.g., using software (program code) executing on suitably configured processors, including workflow manager 302, job creation user interface 304, monitoring module 306, task runner 312, distributed computing systems 314, logging system 316, customer account management module 318, email system 322, and graphing system 326. System 300 can also include or have access to various data stores including an analytics database 320 and a statistics data store 324.

Job creation user interface 304 can provide a graphical user interface, command-line user interface, or other user interface via which an analyst (i.e., a user authorized to access analytics system 300) can define jobs to be executed using system 300. For instance, the analyst can provide a definition that includes a job name, program code specifying the processing to be performed, and identification of one or more data tables (or other data objects) to be produced by the job and/or one or more data tables (or other data objects) to be consumed by the job. In some embodiments, job creation user interface 304 can be implemented on operator console 214 of FIG. 2. There can be multiple instances of job creation user interface 304, and any number of analysts can access the system concurrently.

Workflow manager 302 can coordinate scheduling of jobs. For example, workflow manager 302 can receive job definitions via job creation user interface 304 and can determine when to schedule jobs, e.g., by inferring dependencies between jobs from the data tables (or other data objects) identified as being produced and consumed by various jobs. Examples of job scheduling processes that can be implemented in workflow manager 302 are described below.

Task runner 312 can coordinate execution of the jobs by distributed computing systems 314. For example, when workflow manager 302 determines that a job is ready for execution, workflow manager 302 can dispatch the job, e.g., by delivering a descriptor for the job to task runner 312. Task runner 312 can identify specific computing resources within distributed computing systems 314 that are available for use and that have the requisite capabilities to execute the job, and can instruct those resources to execute the job. Once jobs are completed, task runner 312 can report the completion status to workflow manager 302.

Distributed computing systems 314 can include any type of distributed computing system, such as systems can include systems implementing Hadoop™ distributed-application software and Hive™ data warehouse infrastructure (products of Apache Software Foundation). Other systems and software can also be used. In operation, distributed computing systems 314 can execute instances of jobs, e.g., processing source data from database 320 and/or statistics store 324 and writing output data to database 320 and/or statistics store 324. In some embodiments, distributed computing systems 314 can also access external systems during processing. For example, distributed computing systems 314 can obtain user information, event logs, and/or other raw data from customer account management system 318, logging systems 316, and/or other systems associated with an underlying system or service whose use or behavior to be analyzed using system 300. In some embodiments, task runner 312 can mediate access by distributed computing systems 314 to these external resources (as shown in FIG. 3); in other embodiments, distributed computing system 314 or portions thereof can access these resources directly. In other instances, distributed computing systems 314 can perform operations on data stored in analytics database 320 and/or statistics store 324. Upon completion of a job, distributed computing systems 314 can notify task runner 312.

In some embodiments, task runner 312 can also interact with other systems, e.g., to send reports generated by a job to analysts or other designated recipients. For example, some processing jobs can include emailing a report to selected email addresses, and task runner 312 can provide the report to email system 322 for dissemination after the report has been generated using distributed computing systems 314.

Monitoring interface 306 can receive information from workflow manager 302 regarding the execution and/or completion of jobs. In some embodiments, monitoring interface 306 can present a graphical user interface (e.g., via operator console 214 of FIG. 2) to allow analysts, system administrators, or other operators of system 300 to review the performance of the system. Monitoring interface 306 can also provide notification or alerting services, e.g., by emailing or texting designated operators if certain events occur (e.g., various error conditions or system crashes). In some embodiments, monitoring interface 306 can also perform invalidation of data generated by various jobs.

Graphing system 326 can operate in conjunction with monitoring system 306. For example, graphing system 326 can perform analysis on data generated by various jobs to detect and flag likely errors (e.g., if no data is generated by a job where a non-null result is expected or if the data deviates significantly from expectations). In some embodiments, monitoring interface 306 can provide manual invalidation (module 308) based on user instructions and/or automatic invalidation (module 310) based on analysis by graphing system 326.

Analytics system 300 can be used to manage and execute any number of jobs or workflows (a workflow can include multiple jobs with dependencies, and multiple independent or interlinked workflows can be concurrently defined). An analyst can interact with job creation user interface 304 to define one or more jobs to be executed. Defining a job can include identifying a data table (or other data object) that the job produces and identifying one or more data tables (or other data objects) that are used as inputs to the job. In some embodiments, defining a job can also include providing other information, such as a due date/time by which the job should be completed, a start date/time at which execution of the job should begin, and/or an estimated execution time indicating how long the job is expected to take to execute.

Based on job definitions provide by the analyst(s), workflow manager 302 can schedule jobs for execution by task runner 312. In scheduling jobs, workflow manager 302 can infer dependencies between jobs and a corresponding execution order for dependent jobs based on the analyst's specifications of data objects produced and consumed by various jobs.

In addition, workflow manager 302 can also determine start times for various jobs, based on the inferred dependencies as well as any start dates, due dates, and execution times provided by the analyst(s). For example, referring to FIG. 1, suppose that an analyst specifies that job F 112 should be completed by Monday at 8 a.m. (a due date/time). Using execution times for various jobs and the job-to-job dependencies inferred from FIG. 1, workflow manager 302 can work backward. For instance, if job F 112 requires ten hours to complete, then job F should start no later than 10 p.m. on Sunday. This in turn implies that jobs A 102, E 110, and D 108 need to be completed no later than 10 p.m. on Sunday. Similarly, based on the execution time of job D 108, workflow manager 302 can infer a start time for job C 106 and for jobs B 104 and A 102, which source data for job C 106. (In this example, the critical path for job A 102 is likely to be as a data source for job C, and the start time for job A 102 would be determined accordingly.)

In scheduling jobs, workflow manager 302 can make use of estimated execution times. An estimated execution time can be provided by an analyst, e.g., when defining a new job, and/or determined by workflow manager 302 (or monitoring interface 306), e.g., based on previous executions of the same job or similar jobs. In some embodiments, an initial estimate provided by the analyst can be refined over time based on actual execution of the job.

In some embodiments, workflow management system 300 can store data output from prior jobs in database 320 and/or statistics store 324 for use in subsequent jobs to save repeating portions of processing work. Where prior results can be stored, jobs can be dynamically redefined to leverage stored results. For example, data tables regarding user activity in a week can be generated on a weekly basis, and data tables from different weeks can be combined to provide data regarding longer time periods such as a month, quarter, half-year, or year.

It will be appreciated that system 300 is illustrative and that variations and modifications are possible. For instance, system 300 or portions thereof can be implemented using server architecture 200 of FIG. 2 or different architectures as desired. Distributed computing systems 314 that coordinate activity across multiple processors are currently a practical solution for processing large quantities of data (e.g., millions of records) in a reasonable time frame (e.g., hours rather than weeks); those skilled in the art will recognize that job-processing system implementations can be scaled (anywhere from a single processor up to any larger number of processors) based on capabilities of available processors and/or volume of data to be processed.

In some embodiments, in addition to specifying that a job depends on a particular data table (or other data structure), the analyst can classify the dependency into one of a set of defined dependency types. For example, some embodiments provide analytics related to use of an online service, and various metrics are computed relative to some time period of interest. In such embodiments, it can be useful to classify dependencies as "snapshot" or "interval" types based on the timeframe represented by the data object in question.

Figure 4:
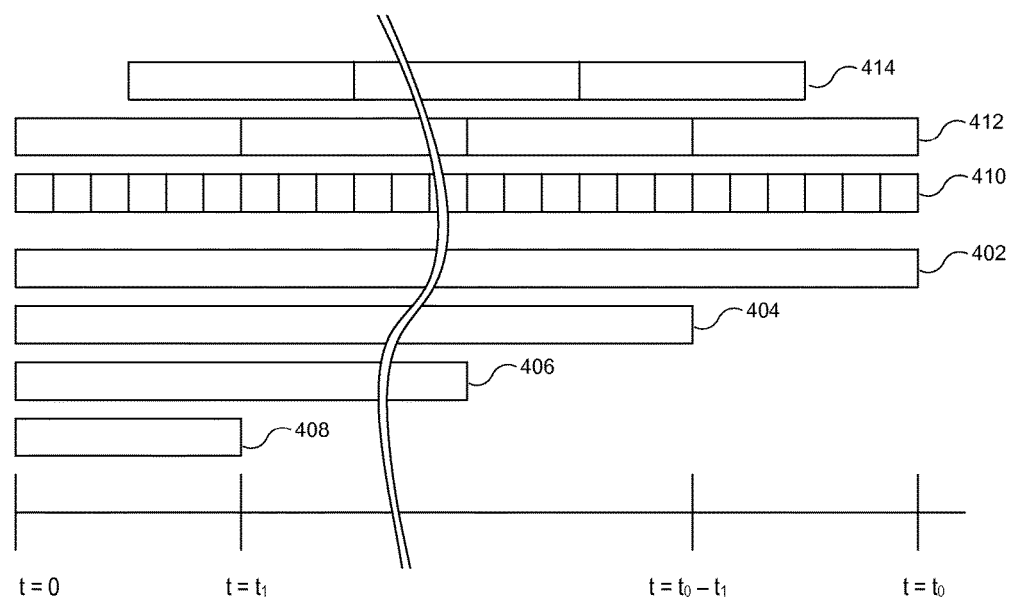
FIG. 4 shows a timeline view illustrating snapshots and intervals according to an embodiment of the present invention.

FIG. 4 shows a timeline view illustrating snapshots and intervals according to an embodiment of the present invention. Shown as bar 402 is a time interval covered by a "snapshot" for a time $t_0$. As used herein, a "snapshot" data object reflects a cumulative state of its data from the "beginning of time" (shown as t=0, which can be, e.g., inception date of an online service) up to a cutoff time (e.g., today or last Tuesday at noon). Snapshots can be taken at different times, examples of which are represented as bars

404, 406, 408. Each snapshot starts at the same time (t=0), but they have different cutoff times. As a result, different snapshot data objects produced from the same source data can contain different, possibly overlapping information.

By way of specific illustration, a list of all registered users of an online service as of a specific cutoff time can be generated as a snapshot data object. The list can include all users who registered at any time prior to the cutoff time and did not unregister prior to the cutoff time. Thus, for example, bars 408, 406, 404, and 402 can represent time periods covered by user lists generated at different times. If user X registers with the service before time $t_1$ and never unregisters, user X will appear in all four snapshots of the user list. If user Y registers at a time after $t_1$ and before $2t_1$, then unregisters at a time after time $(t_0-t_1)$ and before $t_0$, user Y will appear only in snapshots for times 404 and 406.

In contrast to snapshots, bars 410, 412, 414 represent series of "interval" data objects. As used herein, an "interval" data object reflects activity between a (variable) starting time and an ending time. Intervals can have different durations. For example, bar 410 represents intervals of duration $t_1/6$, while bars 412 and 414 represent intervals of duration $t_1$. Start time and end time can be chosen as desired; for example, bars 412 and 414 represent intervals of the same duration but different start (and therefore end) times.

By way of specific illustration, a list of all user identifiers that were used to interact with an online service during a specific time period (e.g., one day, one week, one month) can be generated as an interval data object. A particular user identifier will appear in the list for intervals during which the user interacted with the service and will not appear in other lists.

In accordance with some embodiments of the present invention, a job that generates data can be classified as either a snapshot job or an interval job, depending on whether a snapshot or interval data object is to be generated. Further, job execution can be optimized based on the job definition and other jobs that may have already generated data objects. For example, a job may be defined to execute once per day to generate a snapshot of data regarding registered users of an online service (e.g., a list of user identifiers and/or other data such as each user's geographic location). Rather than reading the entire user database, which may contain millions of user records, on a daily basis, the job can start with the previous snapshot and replay any changes to the user database since the last day, e.g., based on a log of user-database updates. Thus, the job can copy the previous snapshot data object (assuming it is desirable to retain previous snapshots) and use the update log to add any newly registered users, and remove any users who unregistered, thereby generating a new snapshot data object. As another example, a "daily" job may be defined to execute once per day to generate a data table of all users who interacted with an online service at least once during the preceding day, and a weekly job may be defined to execute once per day to generate a data table of all users who interacted with an online service at least once during the preceding week (seven days). The daily job can include reading a daily activity log produced by the online service to extract the user identifiers into the data table and deduplicating the table, and the weekly job can execute by merging the data tables generated by seven instances of the daily job rather than by directly reading the activity logs.

Any given job can consume snapshot data objects, interval data objects, or a combination thereof. Similarly, a job can produce snapshot data objects or interval data objects, regardless of which type of data it consumes. The terms "snapshot job" and "interval job" are used herein to refer, respectively to a job that produces snapshot data and a job that produces interval data.

Figure 5:
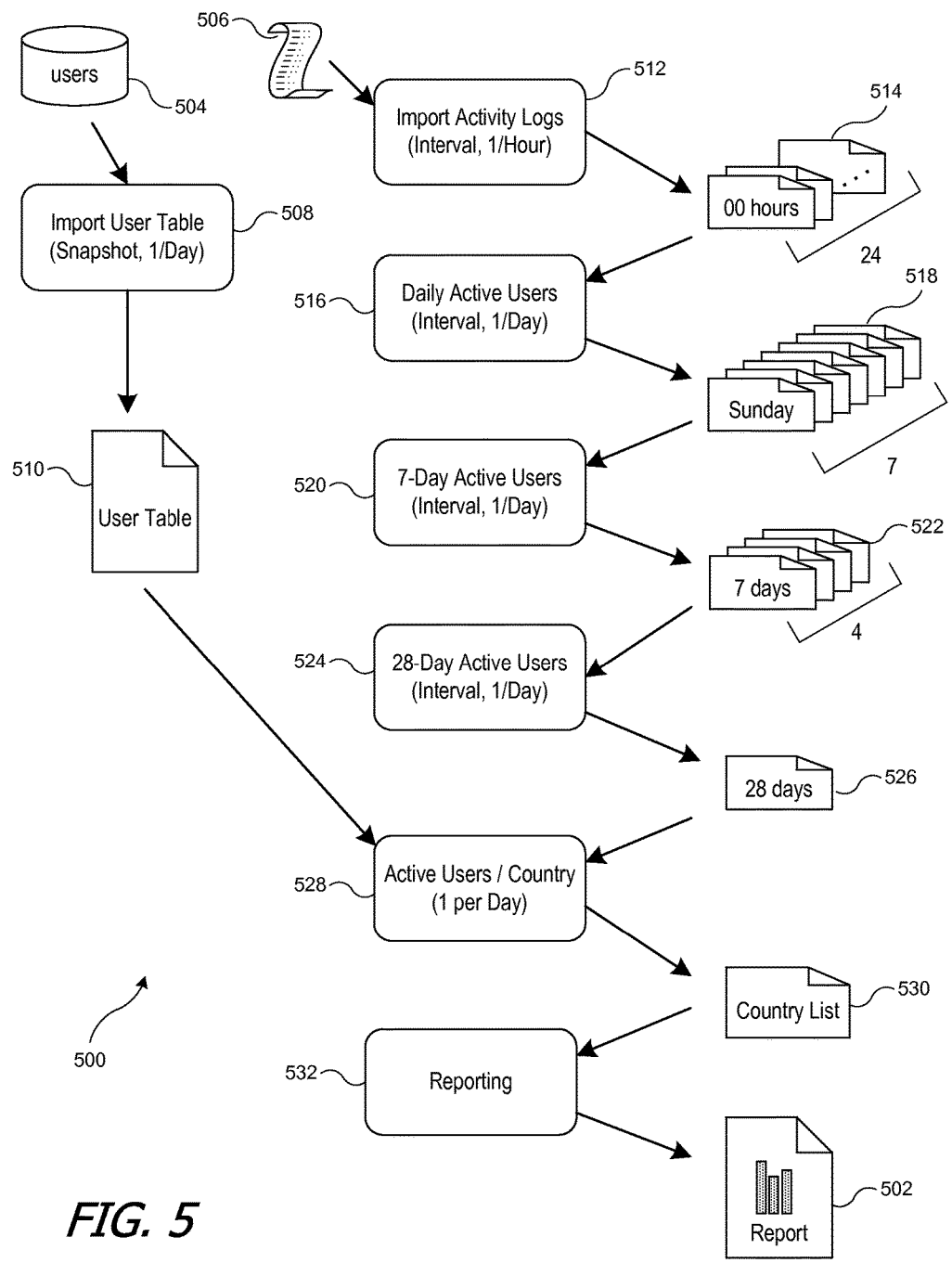
FIG. 5 shows a workflow that can be defined and executed in an analytics system according to an embodiment of the present invention.

For a specific example of use of analytics workflow management system 300, reference is now made to FIG. 5, which shows a workflow 500 that can be defined and executed using system 300 (or other systems) according to an embodiment of the present invention. Workflow 500 produces a report 502 summarizing information about active users of an online service per country over a 28-day period. Report 502 can be produced in any format desired (e.g., text, graphics, etc.) and can include, e.g., the number or percentage of active users who hail from each country.

To produce this information, workflow 500 relies on information about the active users of the online service, such as a user identifier and country of each active user. Portions of this information can be extracted from a user database 504 maintained by the provider of the online service, e.g., using customer account manager 318. User database 504 can contain a record for each user that can include a user identifier (any unique identifier, e.g., a login name, email address, or account number, that a user would be expected to provide when interacting with the online service) and other data about the user, such as a country identifier. In some embodiments, a new record can be added to user database 504 upon creation of each user account, and the account creation process can include asking the new user to identify her country of residence or citizenship. Other techniques can be used to populate user database 504, and process 500 can proceed independently of the manner in which user database 504 is populated.

In addition, since the report is based on active users (defined for purposes of this example as users who interacted with the online service at least once during the relevant time period), workflow 500 requires information about which users interacted with the online service and when. This information can be obtained from activity logs 506 maintained by the online service provider, e.g., using logging system 316 of FIG. 3. Logs 506 can include an entry for each transaction of a user with the online service (or for selected transactions), and each entry can indicate the date/time, the type of transaction (e.g., logging in or out, uploading or downloading a file, purchasing an item, posting content, etc.), the user identifier, and other information as desired.

To make data accessible to system 300, workflow 500 can include jobs that import the data from external sources such as user database 504 and activity logs 506 into analytics database 320. For example, "import user table" job 508 can read user database 504 and create or update a snapshot user table 510 that is stored in analytics database 320. User table 510 can be a snapshot of user database 504 as of a cutoff time associated with generation of report 502. In some embodiments, job 508 can be a job that is scheduled to run periodically (e.g., once per day). As described above, job 508 can be implemented to create an initial snapshot and update the snapshot based on activity logs, rather than repeatedly processing user database 504.

Similarly, "import activity logs" job 512 can read an activity log 506 that covers a relevant time interval (in this case, a one-hour period) and generate a database table 514 that can include a deduplicated list of all user identifiers that had at least one transaction entry in activity log 506. In some embodiments, the table can include other information, such as how many or what kind(s) of transactions were logged for each user identifier. Like job 508, job 512 can be a job that is scheduled to run periodically (e.g., once per hour). Unlike job 508, job 512 can be an interval job that generates a separate data table 514 for each hour's activity log 506. Accordingly, job 512 can generate hourly activity data tables 514 at a rate of 24 tables per day, and tables 514 can be retained for as long as desired (e.g., 30 days, 90 days, one year). In some embodiments, hourly activity data tables 514 can be consumed by a number of different jobs including later jobs within workflow 500 as well as other jobs (not shown) outside workflow 500. For instance, hourly activity data tables 514 can be used to generate statistical data regarding system usage over the course of a day.

For purposes of generating a report covering a 28-day period, hourly activity data tables 514 can be aggregated by subsequent jobs. For example, "daily active list" job 516 can merge 24 hourly data tables 514 into a single (deduplicated) daily data table 518. Like job 512, job 516 can be an interval job that generates a separate data table 518 for each day. Accordingly, job 516 can generate daily activity data tables 518 at a rate of one table per day, and tables 518 can be retained for as long as desired (e.g., 30 days, 90 days, one year). Like hourly activity data tables 514, daily activity data tables 518 can be consumed by a number of different jobs including later jobs within workflow 500 as well as other jobs (not shown) outside workflow 500.

Similarly, "7-day active list" job 520 can merge seven daily data tables 518 into a single (deduplicated) seven-day data table 522. In this example, job 520 can be executed daily to produce successive tables 522 to cover a rolling seven-day period, with each successive pair of tables 522 including six days of overlapping data. Accordingly, job 520 can generate seven-day activity data tables 522 at a rate of one table per day, and tables 522 can be retained for as long as desired (e.g., (e.g., 30 days, 90 days, one year). Like hourly activity data tables 512 or daily activity data tables 518, seven-day tables 522 can be consumed by a number of different jobs including later jobs within workflow 500 as well as other jobs (not shown) outside workflow 500.

One consumer of seven-day tables 522 can be "28-day active list" job 524, which can merge four contiguous (but non-overlapping) seven-day tables into a single table 526 listing all active users for a period of 28 days. Like job 520, job 524 can run daily to produce a table 526 that covers a rolling 28-day period, with consecutive tables 526 including 27 days of overlapping data.

"Active users per country" job 528 can perform a join operation on 28-day activity table 526 and user table 510 (which lists all registered users) to determine a country for each active user, thereby producing a country list 530. In various embodiments, country list 530 can include a table associating each active user identifier with a country and/or statistical information such as the number of active user identifiers per country. Like jobs 520 and 524, job 528 can run daily to produce successive lists 530 covering a rolling 28-day period.

Reporting job 532 can generate a report based at least in part on country list 530. For example, if country list 530 includes statistical information, reporting job 532 can format the statistical information in a user-readable form (e.g., a table, graph, or the like), and create report 502 (e.g., a data file such as a PDF or HTML document) that includes the information. If country list 530 includes a data table, reporting job 532 can include computing statistical information based on the data table as well as formatting the information and creating a user-readable report. In some embodiments, reporting job 532 can include delivering report 502 to one or more end users (e.g., analysts, executives, or other employees of the online service provider), e.g., via email, Intranet document repository, or the like.

Reporting job 532 can also incorporate data from other workflows (not shown) into the report. For instance, active users can be analyzed in a variety of demographic dimensions (e.g., age, gender, education level, income level, etc.) provided that corresponding information about registered users is available. Quantity and or type of user activity can be statistically analyzed and reported on.

Workflow 500 is intended as illustrative of workflows that can be defined in an analytics system such as system 300. It is to be understood that the details of the workflow can be varied. For example, if there is not a need for a rolling seven-day activity report, job 520 can be scheduled to execute weekly rather than on a rolling daily basis. Further, it is to be understood that multiple workflows can be defined in an analytics system and that different workflows can have interdependencies, such that a single source job can produce data that is consumed by multiple sink jobs that perform different operations. For instance, as noted above, a job in a workflow that produces a report on service usage per hour can consume hourly activity data tables 514.

FIG. 5 indicates, using arrows, the dependencies of various jobs on data tables. As described above, an analyst defining jobs 508, 512, 516, 520, 524, 528, and 532 can specify the source data table(s) that each job consumes and the output data table(s) that each job produces. For example, an analyst can create a job definition file for job 524 that specifies that the job consumes four instances of 7-day activity tables 522, produces one instance of 28-day activity table 526, and operates by merging and deduplicating four 7-day activity tables 522 to produce the 28-day activity table 526. In some embodiments, some or all of the job definitions can be parameterized. For example, the job definition file for job 524 can be parameterized by defining the end of the interval covered by job 524 as time "0" and the start time of the interval as time "−28 days" (seconds, hours, or other time units can be used as desired); the output table therefore covers an interval ("−28 days", "−0 days"). The source tables can then be defined as the seven-day source tables covering the intervals ("−28 days", "−22 days"); ("−21 days", "−15 days"); ("−14 days", "−8 days"); and ("−7 days", "−0 days"). Each time the job is run, a specific end date for that instance of the job can be specified (e.g., Apr. 1, 2013), and the correct instances of the source tables can be identified accordingly. From this, workflow manager 302 of FIG. 3 can infer dependencies of each instance of execution of a job on specific instances of execution of other jobs.

Figure 6:
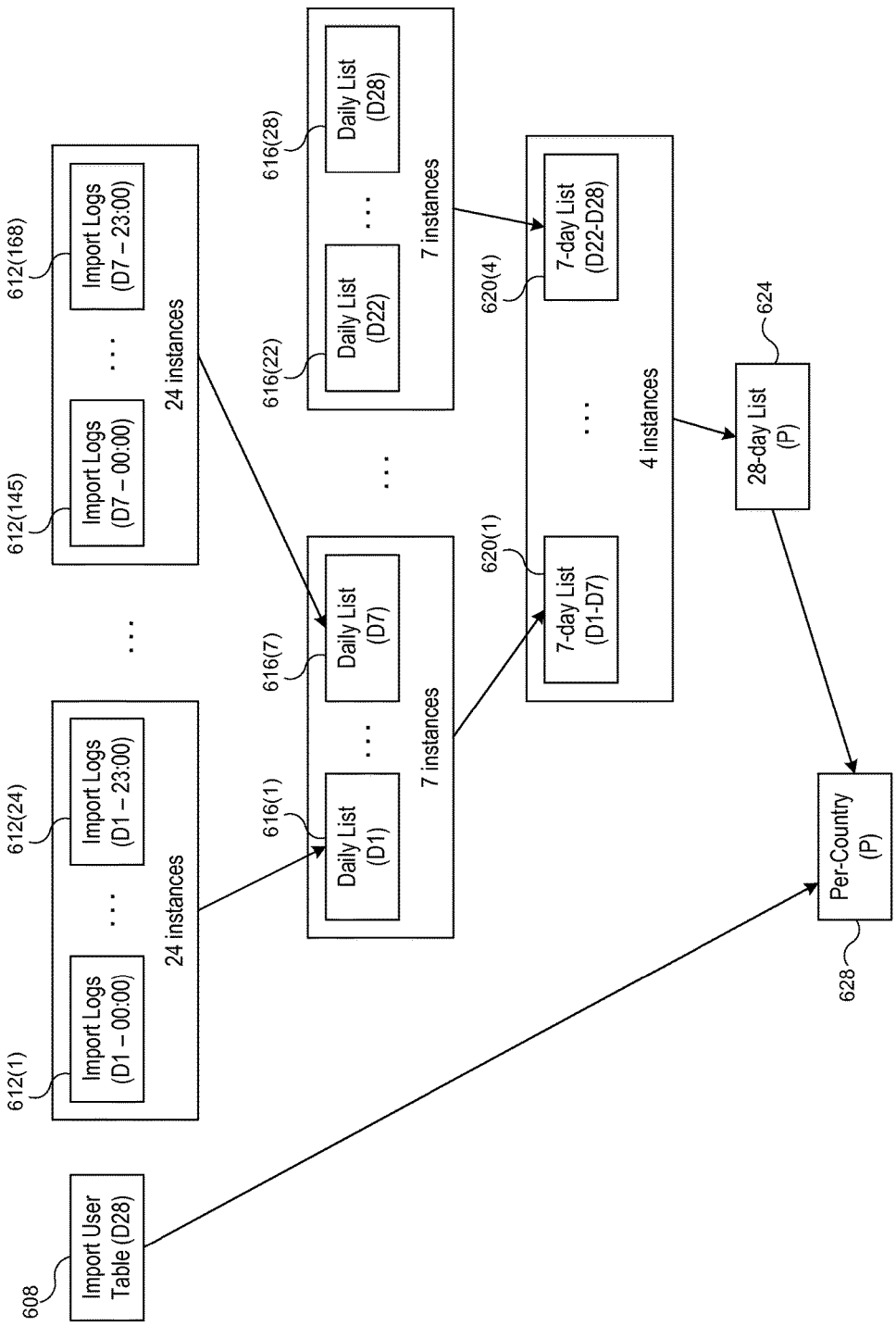
FIG. 6 shows examples of inferred dependencies between specific instances of execution of jobs in the workflow of FIG. 5 according to an embodiment of the present invention.

FIG. 6 shows how dependencies between specific instances of execution of different jobs in workflow 500 can be inferred by workflow manager 302 according to an embodiment of the present invention. (Due to space constraints, not all dependencies are shown.) In FIG. 6, each instance of job execution is identified by the date (and time in the case of hourly jobs) of the data it processes. Within a 28-day period P, days are consecutively numbered D1-D28, and hours within each day are numbered using 24-hour time (choice of time zone can be as desired).

Working backward in time, a goal is to execute a specific instance of job 528, shown in FIG. 6 as "Per-country (P)" instance 628, that covers the 28-day period P. As shown in FIG. 5, job 528 requires a 28-day activity table 526 that is generated by job 524. Accordingly, FIG. 6 shows an inference that job instance 628 depends on "28-day list" job instance 624, which is the instance of job 524 of FIG. 5 that covers the 28-day period P. Continuing, as shown in FIG. 5, job 524 consumes four instances of 7-day activity tables 522, specifically tables for D1-D7, D8-D14, D15-D21, and D22-D28. Accordingly, job instance 624 depends on four job instances 620(1)-620(4), each of which is a different instance of job 520 of FIG. 5 covering a different 7-day period.

As shown in FIG. 5, each instance of job 520 depends on seven daily activity tables generated by job 516. Accordingly, FIG. 6 shows an inference that job instance 620(1) depends on seven daily job instances 616(1)-616(7), each of which is an instance of daily job 516 of FIG. 5 that covers a different day; similarly, job instance 620(4) depends on seven daily job instances 616(22)-616(28). In turn, as shown in FIG. 5, each instance of job 516 depends on 24 hourly instances of job 512. Accordingly, FIG. 6 shows an inference that job instance 616(1) depends on 24 hourly job instances 612(1)-612(24), while job instance 616(7) depends on 24 hourly job instances 612(145)-612(168).

Finally, per-country job instance 628 requires a user table that includes data for the 28-day period P; accordingly, it can be inferred that job instance 628 depends on job instance 608, which is the instance of daily user table job 508 that snapshots the user database through the end of period P (i.e., the daily job for day D28).

As FIG. 6 shows, a single instance 628 of execution of the users-per-country job 528 actually entails dependencies on a very large number (e.g., 192) of other job instances. It should be noted that the analyst defining a workflow does not have to specify all or even any of these job-to-job dependencies. Instead, the analyst can simply specify what data table(s) must be present and up-to-date in order to execute a particular sink job, and workflow manager 302 can infer the dependencies, e.g., by identifying what source job(s) produce the table(s) required by the sink job.

Allowing analysts to define dependencies by reference to source data objects can also simplify the process of modifying job definitions and/or adding new jobs to the system. For example, FIG. 5 shows that "import activity logs" job 512 populates hourly activity data tables 514. In an multi-platform online service, however, it may be desirable to add new activity logs that reflect activity conducted using different platforms. For instance, activity logs 506 can represent activity of users interacting with the online service via a website. A separate log (not shown in FIG. 5) can be maintained representing activity of users interacting with the online service via a mobile-device app (e.g., a dedicated app developed by the provider of the online service for use on mobile devices). It may be desirable to integrate the mobile-device and web-based activity data for at least some reports or other analytic operations.

Figure 7:
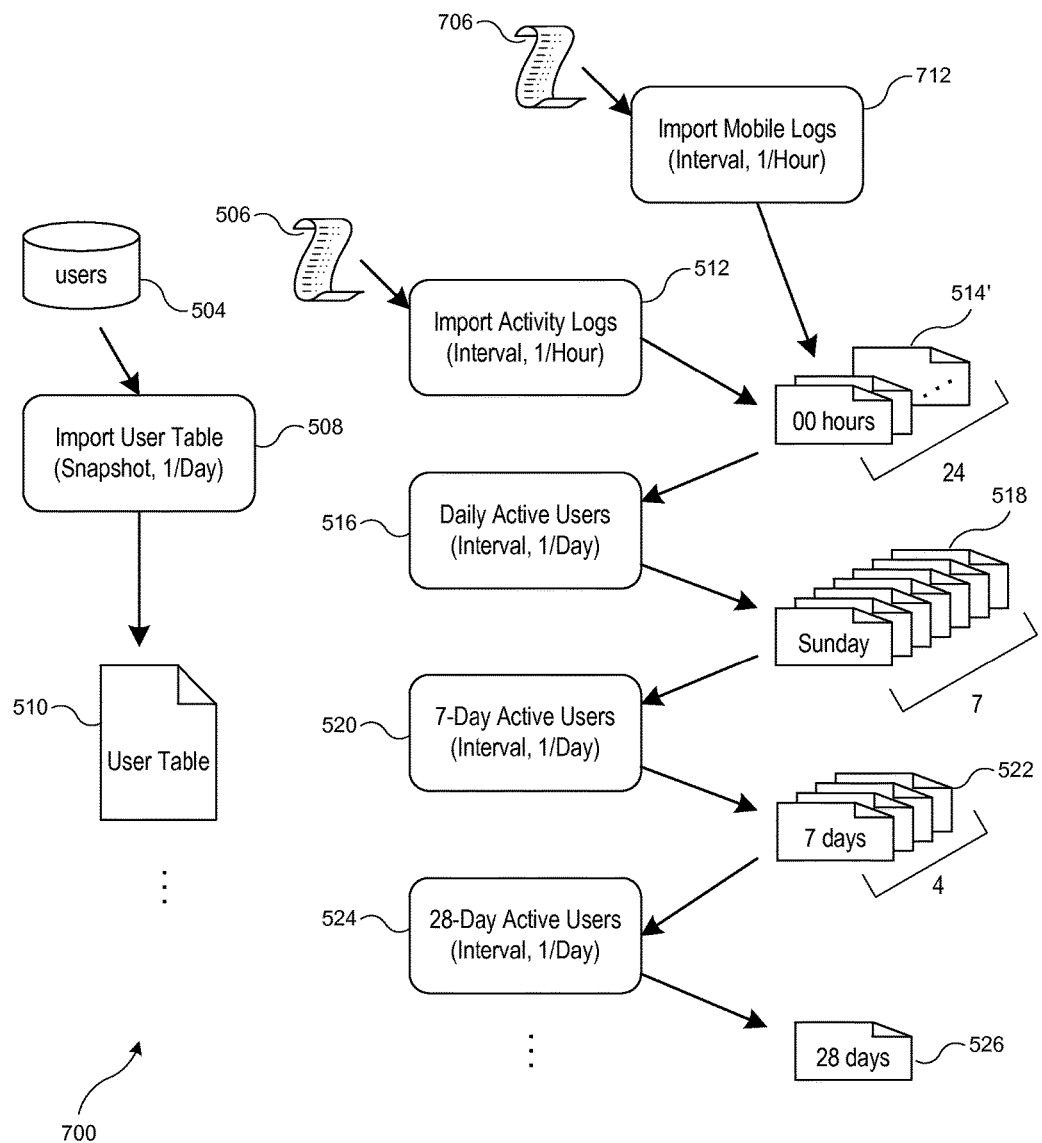
FIG. 7 shows another workflow that can be defined and executed in an analytics system according to an embodiment of the present invention.

FIG. 7 shows a modification to workflow 500 to accommodate a second source of activity logs according to an embodiment of the present invention. Workflow 700 represents a portion of workflow 500 as modified, and jobs that are not modified have the same reference signs as in FIG. 5. (It is to be understood that workflow 700 can also include the portions of workflow 500 that are not replicated in FIG. 7.) As shown, the difference between workflow 500 and workflow 700 is the addition of a new job, "import mobile activity logs" job 712, which reads mobile activity logs 706 and adds the data therefrom to hourly activity data tables 514'. As in workflow 500, "daily active list" job 516 is defined as relying on hourly activity data tables 514'; accordingly, the definition of job 516 (or any downstream job in workflow 500) does not have to be modified as a result of adding job 712.

Figure 8:
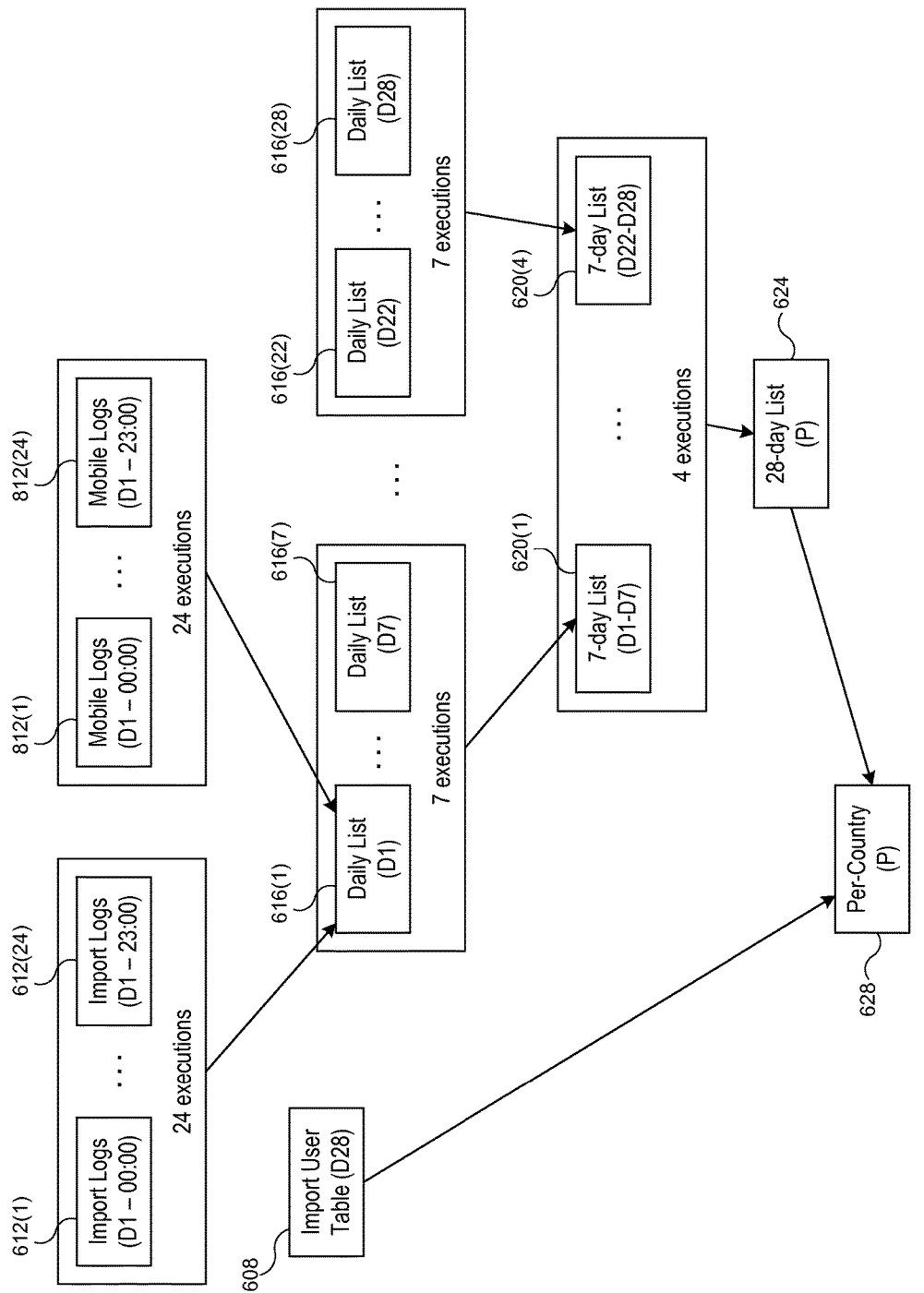
FIG. 8 shows examples of inferred dependencies between specific instances of execution of jobs in the workflow of FIG. 7 according to an embodiment of the present invention.

The scheduling of instances of job 516 may be affected, as workflow manager 302 can now infer that job 516 is dependent on instances of both job 512 and job 712. FIG. 8 shows a modification to the inferred dependencies of FIG. 6 as a result of modified workflow 700 according to an embodiment of the present invention. All dependencies of job instances shown in FIG. 6 remain, but job instance 616(1), which generates the daily activity list for day D1, now depends on 24 job instances 812(1)-812(24), each of which is an instance of job 712 of FIG. 7 corresponding to a different hour of day D1, in addition to 24 job instances 612(1)-612(24) as described above. (Although not shown, it is to be understood that other daily job instances 616(2)-616(28) have corresponding dependencies.)

FIGS. 7 and 8 are provided as examples to illustrate the principle that inferring dependencies between jobs from specified dependencies of sink jobs on source data can simplify the task of modifying workflows and/or source jobs. For instance, new source jobs can be added, as shown. In addition, other modifications can be easily made. One example is introducing a new intermediate job into a workflow, which can be done by defining the new intermediate job as creating a new data object from a source data table that is already in the workflow, then modifying the definition of the job immediately downstream of the new job to consume the new data object. Other portions of the workflow need not be affected. Another example is branching off a new workflow by defining a new job that is a second consumer of any data object produced at any stage of an existing workflow, as well as any subsequent new jobs in the new workflow.

Figure 9:
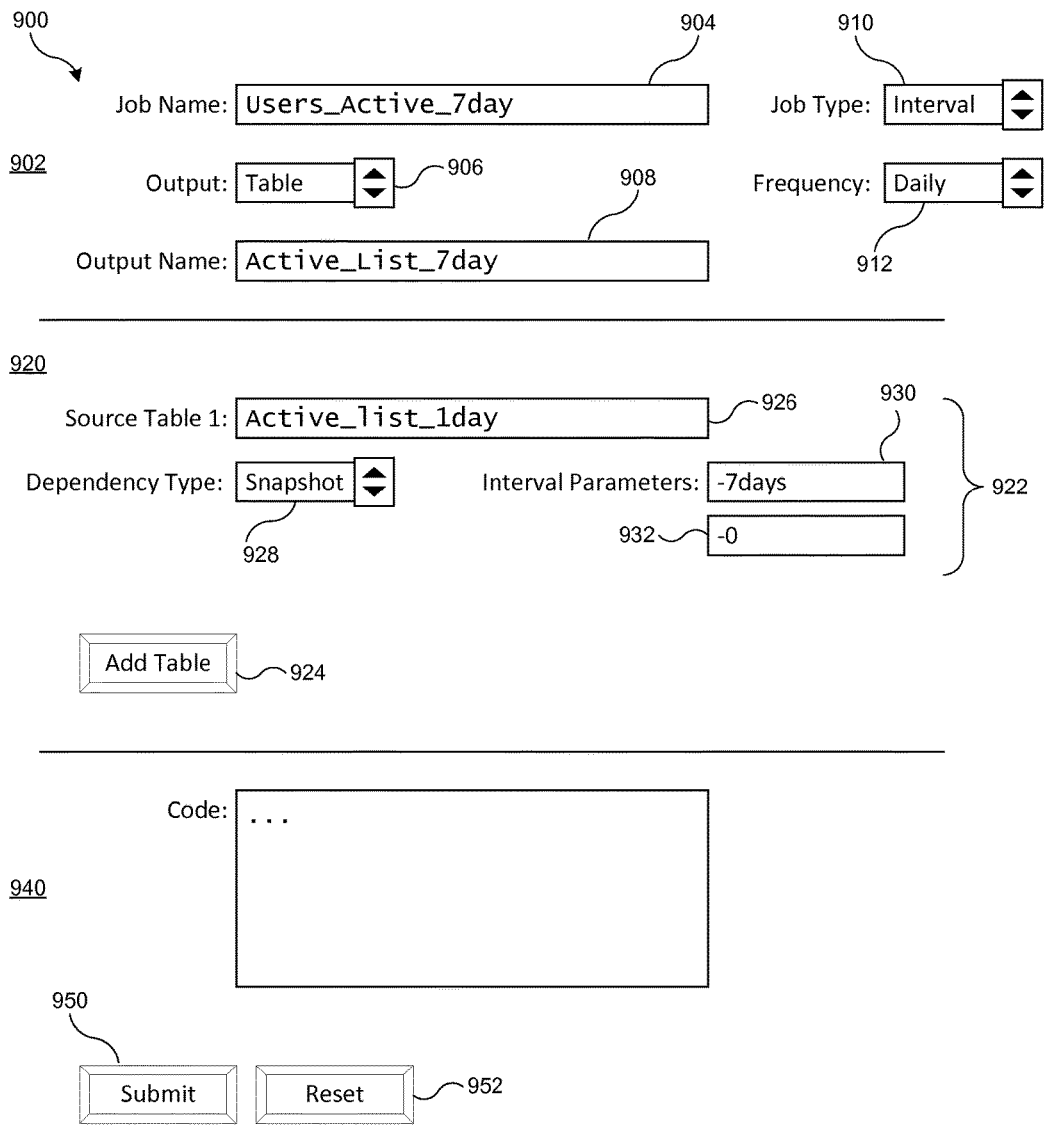
FIG. 9 shows an interface screen for job definition according to an embodiment of the present invention.

In some embodiments, a user interface can be provided to facilitate defining jobs and identifying the data dependencies. FIG. 9 shows an interface screen 900 for job definition according to an embodiment of the present invention. For purposes of illustration, screen 900 shows values that can be entered to define job 520 of FIG. 5.

Section 902 provides data entry elements for a job name (text box 904), output type (dropdown menu 906), output name (text box 908), job type (dropdown menu 910), and frequency of execution (dropdown menu 912). The job name entered in box 904 and output name entered in box 908 can be selected by the analyst who is defining the job. In some embodiments, namespace conventions can be prescribed to avoid duplicating job names; such conventions are a matter of design choice. In some embodiments, the output name can default to being the same as the job name.

Output type dropdown menu 906 can provide various choices such as a data table (e.g., to be stored in analytics database 320 of FIG. 3), statistics (e.g., to be stored in statistics store 324 of FIG. 3), report (e.g., to be stored in a document repository or emailed), etc. Job type dropdown menu 910 can be used to indicate whether the output data produced is snapshot data or interval data; other data classifications can also be defined. Frequency dropdown menu 912 can be used to indicate whether the job is a one-time job or a recurring job; in the latter case, the frequency of recurrence (e.g., hourly, daily, weekly, 28-day, quarterly, yearly) can also be specified. It should be noted that in the case of interval jobs, the frequency of recurrence need not coincide with the duration of the interval covered; for instance, as described above, a job spanning a seven-day interval can be executed daily.

Section 920 can be used to define dependencies on source data tables. For example, one or more instances of subsection 922 can be presented. In some embodiments, one instance of subsection 922 is initially presented, and an analyst can select button 924 to add a second instance (or as many instances as are appropriate for a given job). Each instance of subsection 922 provides a text box 926 to enter the name of a source data table, a dependency type dropdown menu 928, and interval text boxes 930, 932. In this example, the analyst is expected to know the name of each source data table on which the job depends; this can be facilitated by namespace conventions. In some embodiments, text box 926 can be replaced by a dropdown menu or hierarchical navigational interface that allows the analyst to select from source tables that have already been declared to the system (e.g., as output tables for jobs that were previously defined using interface screen 900). Dependency type dropdown menu 928 allows the analyst to specify the nature of the dependency on the source data table, e.g., interval or snapshot. In some embodiments, a table that is generated as a snapshot can have an interval dependency or vice versa. Where an interval dependency is selected, as shown in FIG. 9, the analyst can populate boxes 930, 932 to define the time interval. In some embodiments, the interval can be defined using offsets relative to an (unspecified, at least for recurring jobs) end time (e.g., in FIG. 9, "–0" denotes the end time, and "–7 days" denotes 7 days before the end time); offsets can be specified in any convenient time units (e.g., seconds, hours, days).

Section 940 provides a text box 942 for entering the program code to be executed by the job. Program code for a job can be written in any language supported by system 300, including query processing languages (e.g., SQL, Hive QL), scripting languages (e.g., Python, Perl), compiled languages (e.g., C, C++), or any other language that can be processed and understood by system 300 or the portion thereof that will execute the job (e.g., distributed computing systems 314). In some embodiments, actual program code can be entered into text box 942; in other embodiments, a file identifier of a data file that contains the program code can be entered.

Once the job is defined, the analyst can select submit button 950 to submit the job to workflow manager 302. Reset button 952 can be selected to clear all fields and start over without submitting the job.

In some embodiments, submitting a job using button 950 does not necessarily mean that the job will be scheduled or executed. For example, the organization that operates analytics system 300 may implement a review process for verifying new or modified job definitions prior to actual scheduling or execution. The review process can include automated review (e.g., verifying that the job's program code has correct syntax, that referenced source tables are defined in analytics system 300, that output table names do not conflict with existing names or with an existing namespace convention) and/or manual review (e.g., any of the above, verifying that the job is not redundant with an existing job, verifying that the output of the job is what the analyst intended, etc.).

It will be appreciated that interface 900 is illustrative and that variations and modifications are possible. Different graphical elements can be used, and different input fields or combinations of input fields can be provided. For example, although not shown in FIG. 9, the interface can include input fields for specifying a start date/time for the job, a due date/time for the job, and/or an estimated execution time for the job. In some embodiments, defining a start date/time or due date/time can be optional; workflow manager 302 can infer when one job should start or complete, e.g., based on a due date/time of another job. Thus, for example, an analyst might specify a due date/time only for a final job in a workflow.

In some embodiments, the definition of a job can be parameterized to further facilitate job definition. For example, referring to FIG. 5, "daily active list" job 516, "7-day active list" job 520, and "28-day active list" job 524 can each operate by merging and deduplicating multiple tables (or lists) of active users; these jobs differ in the number of input tables and duration of time covered by each table. Accordingly, a job can be defined with runtime-settable parameters to specify the number of input tables and duration to be covered by each input table, and workflow manager 302 can choose appropriate parameters when creating an instance of the job.

In some embodiments, explicit entry of source table identifiers and/or output object identifiers can be omitted. For example, the program code for a job can include a database query. An analyst can provide the program code, including the query, and workflow manager 302 can parse the query to generate a query tree that identifies specific data tables and/or partitions defined within analytics database 320 that will be accessed to process the query. (In some embodiments, existing database explain commands can be used for this purpose.) Once the tree is generated, workflow manager 302 can identify specific jobs or job instances that produce the identified data tables and/or partitions and can infer dependencies and schedule jobs accordingly.

Figure 10:
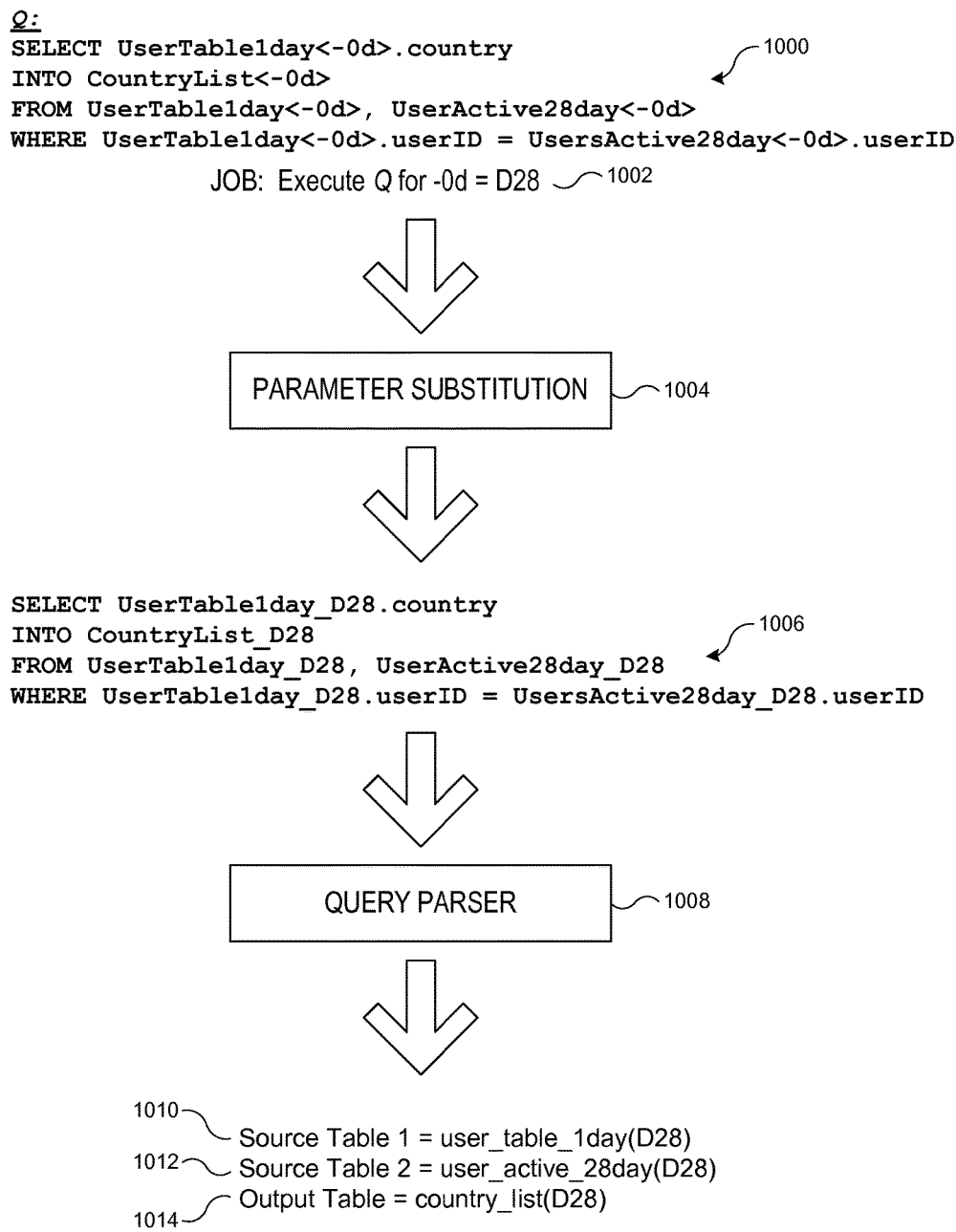
FIG. 10 shows an example of query parsing according to an embodiment of the present invention.

FIG. 10 shows an example of query parsing according to an embodiment of the present invention. In this example, a parameterized query 1000 is provided, e.g., corresponding to job definition 528 of FIG. 5, and an execution instruction 1002 indicates that a specific instance of parameterized query 1000 should be executed for an ending date D28 (which can be a specific date, such as Jul. 1, 2013).

Query 1000 can be provided to a parameter substitution module 1004, which can be implemented in workflow manager 302. Parameter substitution module 1004 can be provided with syntax rules to recognize parameters in names of tables and/or other objects in a query and to replace parameters with corresponding values to identify a specific table that would exist in analytics database 320 if its source job has been executed. In this example, the parameter <–0d> is replaced with a text string representing the particular date D28. Parameter substitution module 1004 can produce an instance-specific query 1006 for the particular job instance to be executed.

Instance-specific query 1006 can be provided to a query parser module 1008, which can also be implemented in workflow manager 302. In this example, query 1006 can be an SQL query, and query parser module 1008 can incorporate a standard SQL parser that can produce a parse tree. Certain nodes of the parse tree can identify source tables and output tables, with the identification being based on their location within the query and the rules of SQL syntax. For instance, instance-specific query 1006 can be recognized as performing an SQL inner join operation, and the particular tables to be joined can be recognized as following the "FROM" keyword while the destination table can be recognized based on the "INTO" keyword. In other embodiments, other query languages and parsers can be used.

Accordingly, from the output of query parser module 1008, tables 1010 and 1012 can be identified as source data tables for the job instance corresponding to execution instruction 1002, and table 1014 can be identified as the output data table. Thus, the analyst need not be required to specifically identify source tables and/or output tables; the table identification can be inferred by parsing the job code itself.

Figure 11:
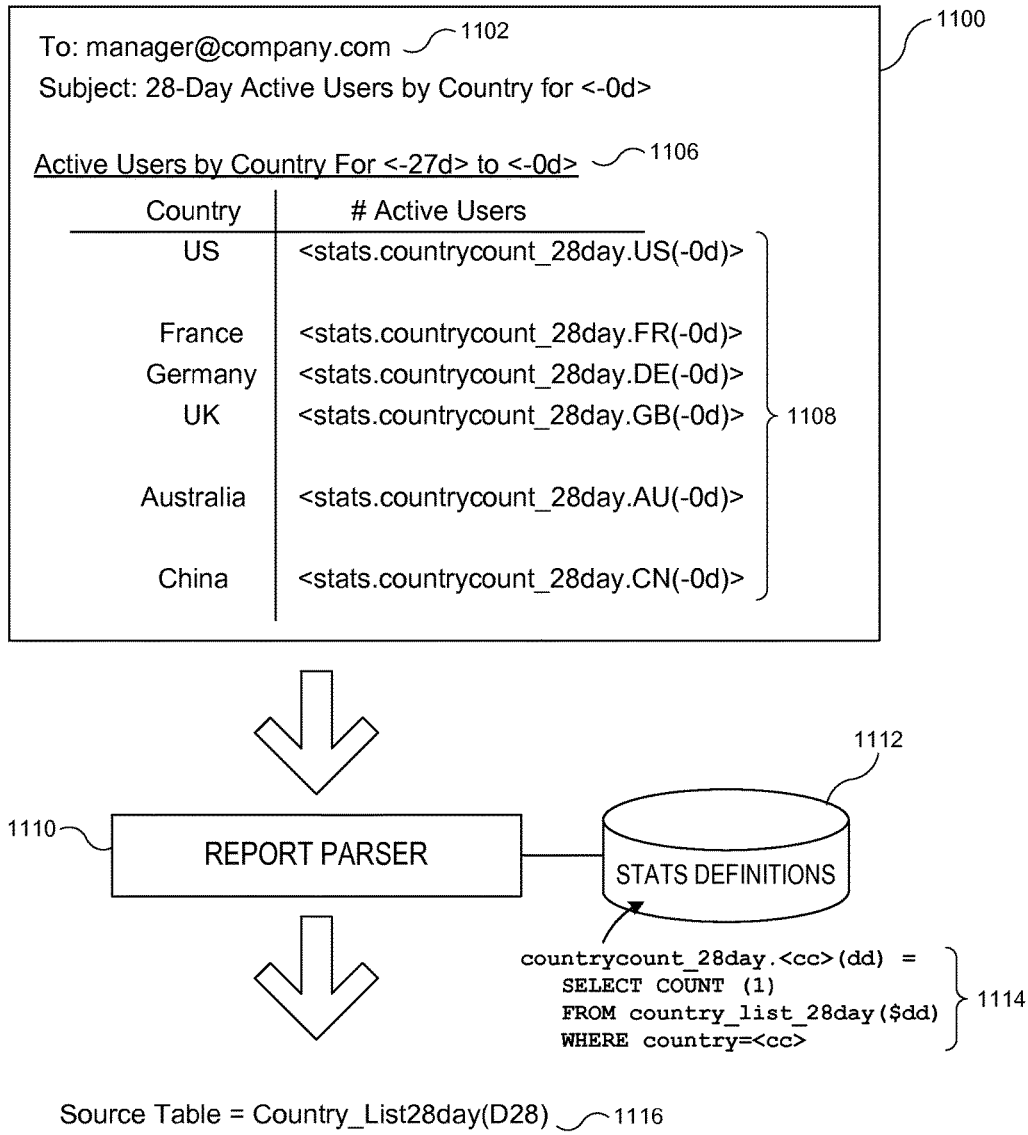
FIG. 11 shows an example of report parsing according to an embodiment of the present invention.

In some embodiments, a job that generates a report (e.g., job 532 of FIG. 5) can be defined at least in part by providing a sample or template report that includes variable names identifying statistics that should be inserted at various places in the report. Workflow manager 302 can parse the report to identify source jobs on which the report depends. FIG. 11 shows an example of report parsing according to an embodiment of the present invention. In this example, a parameterized report template 1100 is provided, e.g., corresponding to report 502 that is to be generated by job 532 of FIG. 5. A schedule for generating report 1100 (e.g., daily, weekly, etc.) can also be specified.

Report template 1100 can include fixed fields, such as "To" line 1102, as well as parameterized fields, such as date range 1106 and user counts 1108. (The syntax shown uses < > as a parameter delimiter; other delimiters can be used.) Report parser 1110, which can be implemented in workflow manager 302, can recognize the parameters and can determine which parameters depend on a source table. For instance, in this example, parameter identifiers beginning with "stats" can denote particular statistics that are predefined within system 300. Report parser 1110 can access a statistics definition data store 1112 (which can be, e.g., part of statistics store 324) to determine the definition of each "stats" parameter in report template 1100. In this example, definition 1114 is itself parameterized, e.g., using two-letter country code <cc> to identify a specific country. However, the source table selection is independent of this parameter and depends only on the end date. Accordingly, report parser 1110 in this example can identify table 1116 as the source table for report 1100. Thus, as in the example of FIG. 10, the analyst need not specifically identify source tables for a report; the table identification can be inferred by parsing a template version of the report. (Although only one source table is shown in the example of FIG. 11, a report can depend on multiple source tables. For example, a report related to active users might include separate sections for the last day, last seven days, last 28 days, and last quarter, and each section would be produced from a different source table.

Figure 12:
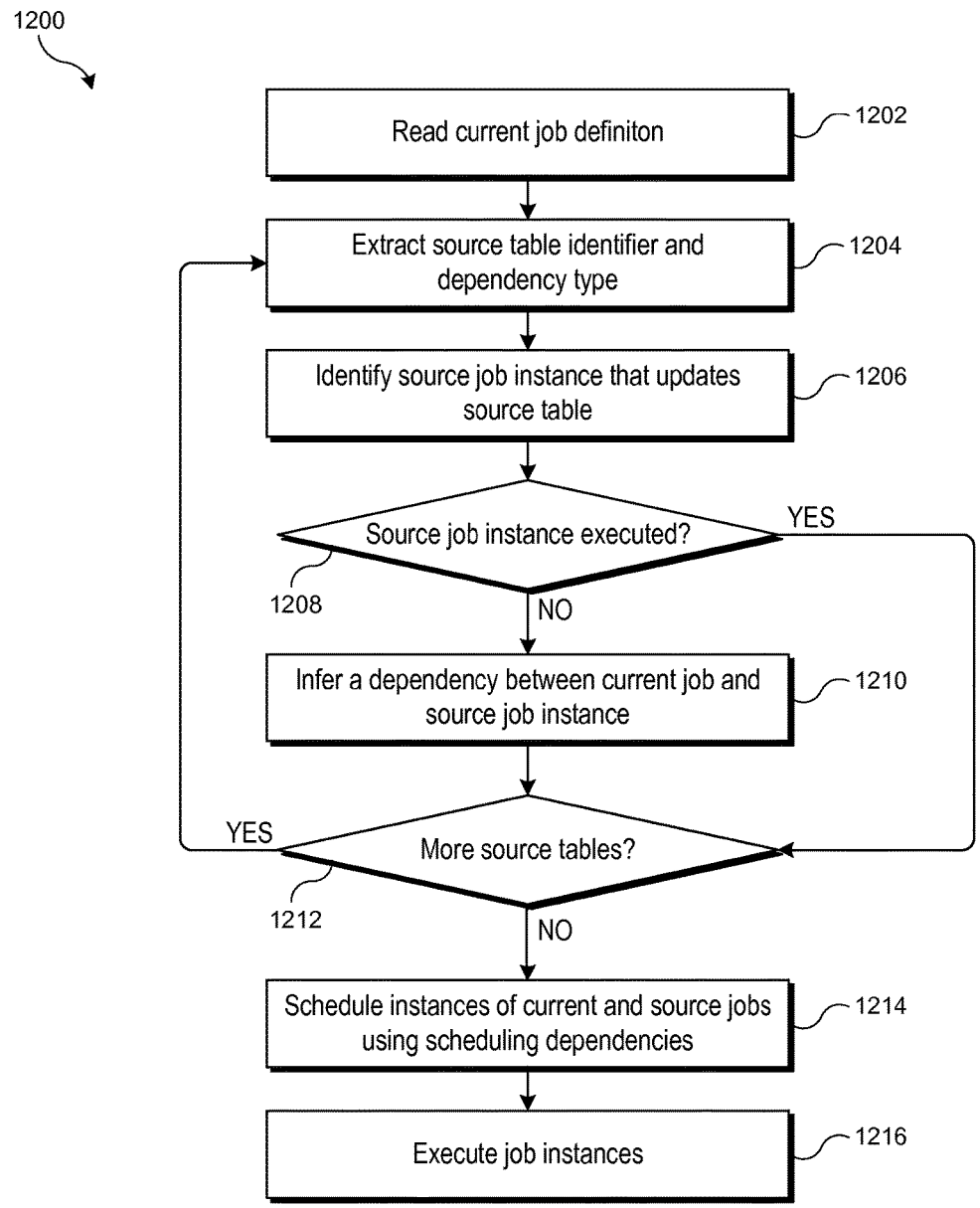
FIG. 12 is a flow diagram of a process for scheduling a job according to an embodiment of the present invention.

Once a job or workflow (a set of jobs with dependencies) is defined, workflow manager 302 can proceed to schedule the job. FIG. 12 is a flow diagram of a process 1200 for scheduling a job according to an embodiment of the present invention. Process 1200 can be implemented, e.g., in workflow manager 302 of FIG. 3.

At block 1202, workflow manager 302 can read a job definition for a "current" job instance to be executed. The job definition can be submitted directly to workflow manager 302, e.g., using interface screen 900 of FIG. 9 or similar interface, or it can be in a job definition file read by workflow manager 302 (a job definition file can be created using interface screen 900 of FIG. 9 or the like), or it can be a query (e.g., as in FIG. 10) At block 1204, workflow manager 302 can extract a source table identifier and dependency type from the job definition (e.g., by directly reading fields from a job definition file or from interface screen of 900 of FIG. 9, or by parsing a query as shown in FIG. 10). In some embodiments, workflow manager 302 can also determine a relevant time window, e.g., based on time offset parameters specified in the job definition.

At block 1206, workflow manager 302 can identify specific source job instances that update the source data table for the relevant time window. For example, in the case of job instance 624 of FIG. 6, workflow manager 302 can identify source job instances 620(1)-620(4).

In some embodiments, some or all of the source job instances may have already executed. Accordingly, at block 1208, workflow manager 302 can determine whether this is the case (e.g., by determining what data tables exist in analytics database 320 or by consulting its own record of job execution). If a source job instance has not executed, then at block 1210, workflow manager 302 can define a scheduling dependency between the current job instance and the source job instance. Block 1210 can include setting an indicator (e.g., in a scheduling table) to indicate that the current job should not be dispatched until all of its source job instances are complete. In some embodiments, if a source job instance is not currently scheduled, block 1210 can include retrieving a job definition for the source job and recursively performing process 1200 to schedule instances of the source job and any further source jobs that may be required.

At block 1212, workflow manager 302 can determine whether the job definition for the current job includes additional source tables. If so, process 1200 can return to block 1204 to identify further scheduling dependencies. Once all source tables have been processed at block 1212, workflow manager 302 can schedule job instances at block 1214 using the scheduling-dependency information determined at block 1208. Other information can also be used when scheduling job instances, such as a desired time of completion, start time, and/or estimated completion time of various job instances that are being scheduled, expected availability of computing resources, etc.

At block 1216, after scheduling one or more job instances, workflow manager 302 can proceed to execute job instances based on the schedule. Execution of job instances can include, e.g., dispatching jobs to task runner 312 of FIG. 3. In some embodiments, execution can be dynamic in that the start time of a given job instance is determined based on completion of all job instances on which the given job instance depends. For example, job instance 624 of FIG. 6 can be held in a not-ready state until all job instances 620(1)-620(4) have been completed, and job instance 624 can be launched at any time thereafter.

It will be appreciated that process 1200 is illustrative and that variations and modifications are possible. Steps described as sequential may be executed in parallel, order of steps may be varied, and steps may be modified, combined, added or omitted. For instance, it is assumed that all source jobs that produce data tables sourced by a particular sink job have already been defined to workflow manager 302 before process 1200 executes for the sink job; that is, earlier jobs in a workflow or dependency chain should be defined before jobs on which they depend. This may require a particular order of traversal of job definitions. In some embodiments, workflow manager 302 can set a placeholder as the source job for a source data table whose source job has not yet been defined. If the source job for a placeholder is not defined by the time workflow manager 302 finishes processing job definitions, an error can be generated indicating that a requested source data table has no source job. Any defined jobs that are not dependent (directly or indirectly) on the "missing" source job can be scheduled and executed.

Figure 13:
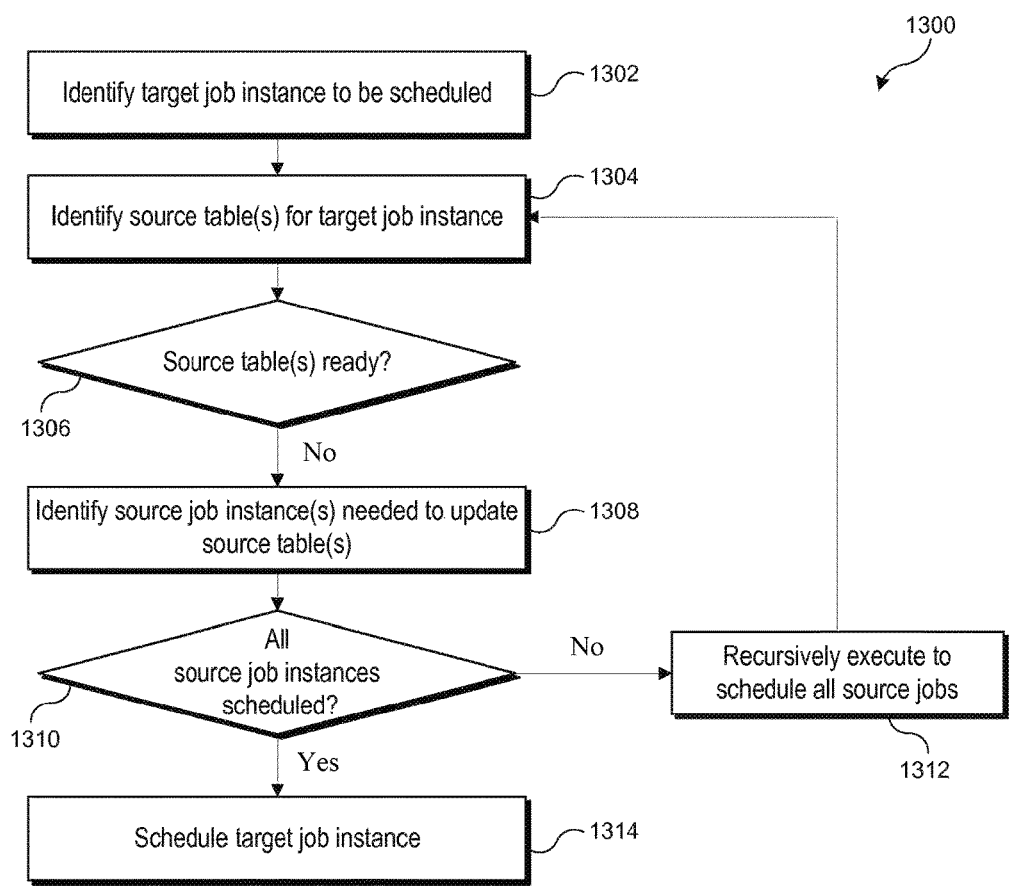
FIG. 13 is a flow diagram of another scheduling process according to an embodiment of the present invention.

In some instances, source table(s) needed for a given job instance may be partially populated due to execution of some but not all of the source job instances. For example, referring to FIG. 7, hourly activity tables 514' are populated in part by instances of job 512 and in part by instances of job 712. Accordingly, some embodiments of workflow manager 302 can determine when some but not all of the job instances needed to fully update a source data table have executed and can schedule the remaining job instances. FIG. 13 is a flow diagram of another scheduling process 1300 that can be implemented, e.g., in workflow manager 302, according to an embodiment of the present invention.

At block 1302, process 1300 can identify a job instance (also referred to as a target job instance) to be scheduled. For instance, an analyst may specifically request that a particular job be executed, or a job instance may be automatically requested (e.g., on an hourly, daily, or weekly basis or the like). At block 1304, process 1300 can identify the source data table(s) required for the job instance identified at block 1302. For instance, referring to FIG. 7, any given instance of daily active users job 516 requires 24 hourly activity data tables 514', covering the same 24-hour interval as that instance of job 516. In various embodiments, block 1304 can include referring to job definition files and/or to job definitions entered by an analyst.

At block 1306, process 1300 can determine whether each source data table is ready for consumption by the job instance to be scheduled. For instance, referring again to FIG. 7, it may be the case that a given activity data table 514' is not considered ready for consumption by job 516 until instances of both of import jobs 512 and 712 covering that table's time period have executed. Accordingly, block 1306 can include identifying source job instances and determining their execution status. In other embodiments, each data table can have associated metadata indicating its "update" status, e.g., which of its source jobs have executed and, for each source job that has executed, its completion status, and process 1300 can use this information to determine whether the source data table is ready for consumption.

If, at block 1306, a particular source data table is not ready for consumption, then at block 1308, process 1300 can identify one or more source job instance(s) that should be executed to update the source data table into a state of readiness for consumption. For instance, referring again to FIG. 7, it may be the case that a given activity table 514' covering a specific hour (e.g., the 12:00 hour on day D7) has been populated by an instance of job 512 but not by an instance of job 712. Accordingly, at block 1308, process 1300 would identify that an instance of job 712 covering the same hour (e.g., the 12:00 hour on day D7) should be executed. At block 1310, process 1300 can determine whether the needed source job is already scheduled for execution. If not, process 1300 can be used to schedule the needed source job, e.g., by recursive execution (block 1312) of process 1300 (with the source job becoming the target job for the next iteration), which may result in scheduling further source job instances for one or more source jobs of the original target job instance, and so on. Once all source job instances are scheduled (or if block 1306 results in a determination that all source tables are already ready), the target job instance can be scheduled at block 1314.

Like process 1200, process 1300 is illustrative, and variations and modifications are possible. In some instances, a data table covering a particular time interval (e.g., a day) may have status metadata indicating that data for part of the interval (e.g., an hour) is missing, and workflow manager 302 can schedule a job instance for execution that covers just the missing interval rather than executing a job instance for the entire interval. This can reduce duplicative processing jobs and improve efficiency of resource use. In some embodiments, supporting job definitions that include runtime parameters (e.g., as described above) can facilitate such dynamic scheduling.

In some embodiments of a scheduling process, some or all workflows or jobs may start from data that is external to system 300. For example, workflow 500 of FIG. 5 starts with job 508 that imports data from user database 504 (which can be external to system 300) into analytics database 320 and job 512 that imports data from user activity log 506 (which can also be external to system 300) into analytics database 320. Thus, certain jobs within a workflow may not have a source data object within system 300. However, these jobs may still be dependent on their source data existing; the difference is that where the source data is external, it may not be possible for workflow manager 302 to verify whether the source data is ready for processing. Accordingly, process 1200 (or process 1300 or other scheduling process) can assume that jobs with no internal source data objects are always ready for executing and schedule instances of such jobs at any time. In some embodiments, a delay can be imposed between the time period covered by the job instance and the earliest allowed start time of the job instance, e.g., to give the external data source time to be brought current through the end of the time period covered by the job.

In some embodiments, workflow manager 302 can manage external dependencies as well as internal dependencies. For instance, a job can be defined as having an "internal" dependency (e.g., a dependency on a data object that is created and stored by system 300) and/or an "external" dependency (e.g., a dependency on source data that is not created and stored by system 300). Where a job has an external dependency, the job definition can specify the external data source on which the job depends. Workflow manager 302 can in some instances receive information indicating when the external data source is up to date and can use that information to schedule jobs with external dependencies.

For example, consider job 512 of FIG. 5, which imports user activity logs 506. In some embodiments, an infrastructure monitoring system can be used to determine the state of the logging system that generates activity logs 506. (Nagios® infrastructure monitoring software, a product of Nagios Enterprises, LLC, or other similar software can be used for monitoring the logging system.) The infrastructure monitoring system can send reports on the state of the logging system and/or the activity logs to workflow manager 302, and workflow manager 302 can use the reports to determine when to dispatch instances of job 512 for execution.

Further, as described above, workflow manager 302 can schedule an instance of a sink job based on completion of the source-job instances on which the sink job instance depends. In some embodiments, successful completion of a source job can be required as a condition for executing a sink job. In other embodiments, some or all of the dependencies can be classified as "weak" dependencies, meaning that while the sink job should wait until the source job completes, successful completion of the source job is not required.

For example, a job instance can complete with or without errors. As used herein, a "successful" job instance refers to the case where the job completed without errors. To distinguish among job instances that complete with errors, various error modes can be defined. For example, an error mode of "failed" can be used to indicate that the job failed to complete, while an error mode of "invalid" (also referred to herein as "soft failure") can be used to indicate that the job successfully processed the input data it received, but not all of the expected data was received or that output data generated by the job fails to satisfy some metric of plausibility defined within the job (e.g., number of transactions in a given time interval is suspiciously high or suspiciously low given normal levels of user activity). In some embodiments, where a dependency is classified as a weak dependency, a sink job can be executed if the source job experienced a soft failure but not if it experienced a hard failure. Where a sink job is executed using output from a source job that experienced a soft failure, the sink job can also be assigned a soft failure status by default. In embodiments where workflow manager 302 uses status metadata for a source data table to determine when to execute a sink job, the status metadata can include an indication of the completion status of each job that contributed to the source data table. In some embodiments, an analyst defining a job can specify the required completion status of the source jobs; for instance, a dependency on a table can be classified as "strong" (successful completion of all source jobs required) or "weak" (successful completion or soft failure of all source jobs required). Output data tables produced by a sink job that used as input data that had a soft failure can also be flagged as soft failure, and if a further error occurs in a sink job, a soft failure can become a hard failure. Other techniques for allowing data tables (or other data objects) with soft failures to be consumed by downstream jobs can be used.

As described above, certain embodiments of the present invention can facilitate definition of jobs and workflows within a data analytics system. For example, complex dependencies between source and sink jobs, including chains of dependencies that may involve large numbers of job instances, can be defined by reference to the data object(s) each job depends on; the analytics system can automatically infer job-to-job dependencies and can schedule job execution in a manner that respects the dependencies. This can simplify the analyst's task in correctly specifying dependencies. Further, if a source job that produces particular data that is consumed by other jobs (such as a user activity table described above) is redefined (e.g., to add an additional job to the workflow), it is not necessary for the analyst to identify and update all the jobs that consume data produced by the redefined source job to reflect their dependency on the additional job. In some embodiments, a workflow manager can dynamically define jobs (e.g., using runtime parameters) to generate missing portions of source data for a particular consumer job.

While the invention has been described with respect to specific embodiments, one skilled in the art will recognize that numerous modifications are possible. For example, the particular jobs, workflows, data tables, other data structures, and computing systems described herein are used for purposes of illustration; other jobs, workflows, data structures, and computing systems can be substituted. Techniques for job definition and/or job scheduling and execution can also be modified as appropriate for a particular implementation.

Further, although the description above makes specific reference to analysis and reporting of user activity related to an online service, those skilled in the art will recognize that similar techniques and concepts can be applied to other analytics systems, including business intelligence systems, data mining systems, and any other type of large-scale automated analysis system that obtains and manipulates large quantities of data, or more generally in any context where performance of a data-consuming task is contingent on completion of a data-producing task.

As noted above, it is not required that every job execution result in success. Failures can occur. If a failure occurs, a job can be programmed to retry, exit, ignore, provide a substitute response (e.g. making a report item state "Not Available" instead of a result), etc. Sink jobs that depend on a failed job can determine whether to continue, retry or stop, and such determinations can be based in part on the particular failure mode as described above.

The dependency examples described above relate to instances where one job produces data that is consumed by another, and it is assumed that execution of the consumer (sink) job should not begin until the producer (source) job has completed. In some embodiments, other models of dependency between source jobs and sink jobs can exist. For example, a source job may be implemented as a streaming job that continually adds new data to a data table, file, stream buffer, or other data object that is read by the sink job. In this case, the sink job need only wait until execution of the source job reaches some milestone or checkpoint within the stream. As another example, the sink job can begin execution while the source job is still producing data, provided that the sink job can keep track of which data it has already processed and can continue processing until notified that the source job is complete (or that the source job will not produce additional data). In some embodiments, different dependency models can coexist, and an analyst defining a job can specify the model to be used for a given sink job.

In some embodiments, jobs can be dynamically redefined, e.g., to exploit available data and avoid reprocessing. For example, if a job is defined to generate an activity table for a specific time interval (e.g., the month of February) and an activity table for a portion of the period (e.g., the first two weeks of February) already exists, the job can be redefined to generate the table for the remaining portion of the period (e.g., the last two weeks in February) and merge the new table with the existing table.

Embodiments described above may make reference to data structures and databases, storage or data stores. It is to be understood that these terms can encompass any techniques for organizing information into discrete records that can be stored, retrieved and interpreted by computer systems. In some embodiments, a distributed computing system can be organized such that it appears to external entities as a single data store that can receive queries (e.g., SQL-like queries). Similarly, techniques that have been described with reference to data tables can be modified to use other data structures, including relational or non-relational data structures and/or databases, arrays, linked lists, or the like.

Job definition can be performed by analysts, including any person with access to the analytics system. In some embodiments, any analyst can independently define jobs. In other embodiments, the job-creation process can include review and approval by other analysts and/or by automated processes that can verify whether the new job conforms to acceptable data integrity practices, namespace conventions adopted for the analytics system, limits on execution time and/or processing resource requirements, and/or any other constraints that may be imposed on a particular system. Such review and approval can occur before the job is scheduled by workflow manager 302. Some embodiments may provide a "sandbox" version of the analytics system for purposes of testing new job definitions prior to adding them to the production analytics system.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A computer-implemented method comprising:
    receiving, at a computer system, via graphical user interface controls of a job creation graphical user interface, a plurality of job definitions for a plurality of jobs, each job definition of the plurality of job definitions specifying at least a source data object to provide input data to be consumed by the job, and an output data object to store output data produced by the job;
    wherein the plurality of job definitions includes a first job definition and a second job definition;
    wherein the plurality of jobs includes a first job and a second job;
    wherein the first job definition is for the first job;
    wherein the second job definition is for the second job;
    automatically inferring, by the computer system, a first dependency of the first job on the second job;
    wherein the automatically inferring the first dependency is based at least in part on automatically determining that the source data object specified in the first job definition is the output data object specified in the second job definition;
    based at least in part on the automatically inferring the first dependency, dispatching, by the computer system, a first plurality of job instances for execution, wherein the dispatching the first plurality of job instances is controlled such that a first instance of the first job, of the first plurality of job instances, is blocked from being dispatched until after a first instance of the second job, of the first plurality of job instances, completes;
    after the dispatching the first plurality of job instances for execution, receiving, at the computer system, via graphical user interface controls of the job creation graphical user interface, a third job definition;
    wherein the third job definition is for a third job;
    wherein the third job definition specifies at least a source data object to provide input data to be consumed by the third job, and an output data object to store output data produced by the third job;
    based at least on the third job definition, automatically inferring, by the computer system, a second dependency;
    wherein the second dependency is the first job on the third job;
    wherein the second dependency is automatically inferred based at least in part on automatically determining that the source data object specified in the first job definition is the output data object specified in the third job definition; and
    based at least in part on the automatically inferring the first dependency and the automatically inferring the second dependency, dispatching, by the computer system, a second plurality of job instances for execution, wherein the dispatching the second plurality of job instances is controlled such that a second instance of the first job, of the second plurality of job instances, is blocked from being dispatched until after both: (a) a second instance of the second job, of the second plurality of job instances, completes, and (b) a first instance of the third job, of the second plurality of job instances, completes.

2. The computer-implemented method of claim 1 wherein at least one job definition of the plurality of job definitions specifies whether a dependency on the source data object, of the at least one job definition, is an interval dependency such that the source data object, of the at least one job definition, contains data associated with a specified time interval or a snapshot dependency such that the source data object, of the at least one job definition, contains a snapshot of data reflective of a current condition at a specified snapshot time.

3. The computer-implemented method of claim 1 wherein at least one job definition of the plurality of job definitions specifies whether the output data object comprises a snapshot of data or data for a time interval.

4. The computer-implemented method of claim 1 wherein at least one job definition of the plurality of job definitions specifies that the output data object comprises data for a time interval, the at least one job definition of the plurality of job definitions further specifies a duration of the time interval.

5. The computer-implemented method of claim 1, wherein a database job definition, of the plurality of job definitions, of a database job, of the plurality of jobs, specifies the source data object to provide input data to be consumed by the database job, as part of a database query.

6. One or more non-transitory computer-readable media storing one or more programs for execution by one or more processing units, the one or more programs comprising instructions configured for:
    receiving, at a computer system, via graphical user interface controls of a job creation graphical user interface, a plurality of job definitions for a plurality of jobs, each job definition of the plurality of job definitions specifying at least a source data object to provide input data to be consumed by the job, and an output data object to store output data produced by the job;
    wherein the plurality of job definitions includes a first job definition and a second job definition;
    wherein the plurality of jobs includes a first job and a second job;
    wherein the first job definition is for the first job;
    wherein the second job definition is for the second job;
    automatically inferring, by the computer system, a first dependency of the first job on the second job;
    wherein the automatically inferring the first dependency is based at least in part on automatically determining that the source data object specified in the first job definition is the output data object specified in the second job definition;

based at least in part on the automatically inferring the first dependency, dispatching, by the computer system, a first plurality of job instances for execution, wherein the dispatching the first plurality of job instances is controlled such that a first instance of the first job, of the first plurality of job instances, is blocked from being dispatched until after a first instance of the second job, of the first plurality of job instances, completes;

after the dispatching the first plurality of job instances for execution, receiving, at the computer system, via graphical user interface controls of the job creation graphical user interface, a third job definition;

wherein the third job definition is for a third job;

wherein the third job definition specifies at least a source data object to provide input data to be consumed by the third job, and an output data object to store output data produced by the third job;

based at least on the third job definition, automatically inferring, by the computer system, a second dependency;

wherein the second dependency is the first job on the third job;

wherein the second dependency is automatically inferred based at least in part on automatically determining that the source data object specified in the first job definition is the output data object specified in the third job definition; and based at least in part on the automatically inferring the first dependency and the automatically inferring the second dependency, dispatching, by the computer system, a second plurality of job instances for execution, wherein the dispatching the second plurality of job instances is controlled such that a second instance of the first job, of the second plurality of job instances, is blocked from being dispatched until after both: (a) a second instance of the second job, of the second plurality of job instances, completes, and (b) a first instance of the third job, of the second plurality of job instances, completes.

7. The one or more non-transitory computer-readable media of claim 6 wherein at least one job definition of the plurality of job definitions specifies whether a dependency on the source data object, of the at least one job definition, is an interval dependency such that the source data object, of the at least one job definition, contains data associated with a specified time interval or a snapshot dependency such that the source data object, of the at least one job definition, contains a snapshot of data reflective of a current condition at a specified snapshot time.

8. The one or more non-transitory computer-readable media of claim 6 wherein at least one job definition of the plurality of job definitions specifies whether the output data object comprises a snapshot of data or data for a time interval.

9. The one or more non-transitory computer-readable media of claim 6 wherein at least one job definition of the plurality of job definitions specifies that the output data object comprises data for a time interval, the at least one job definition of the plurality of job definitions further specifies a duration of the time interval.

10. The one or more non-transitory computer-readable media of claim 6, wherein a database job definition, of the plurality of job definitions, of a database job, of the plurality of jobs, specifies the source data object to provide input data to be consumed by the database job, as part of a database query.

11. A computer system comprising:
one or more processing units;
memory;
one or more programs stored in the memory and configured for execution by the one or more processing units, the one or more programs comprising instructions configured for:
receiving, at the computer system, via graphical user interface controls of a job creation graphical user interface, a plurality of job definitions for a plurality of jobs, each job definition of the plurality of job definitions specifying at least a source data object to provide input data to be consumed by the job, and an output data object to store output data produced by the job;
wherein the plurality of job definitions includes a first job definition and a second job definition;
wherein the plurality of jobs includes a first job and a second job;
wherein the first job definition is for the first job;
wherein the second job definition is for the second job;
automatically inferring, by the computer system, a first dependency of the first job on the second job;
wherein the automatically inferring the first dependency is based at least in part on automatically determining that the source data object specified in the first job definition is the output data object specified in the second job definition;
based at least in part on the automatically inferring the first dependency, dispatching, by the computer system, a first plurality of job instances for execution, wherein the dispatching the first plurality of job instances is controlled such that a first instance of the first job, of the first plurality of job instances, is blocked from being dispatched until after a first instance of the second job, of the first plurality of job instances, completes;
after the dispatching the first plurality of job instances for execution, receiving, at the computer system, via graphical user interface controls of the job creation graphical user interface, a third job definition;
wherein the third job definition is for a third job;
wherein the third job definition specifies at least a source data object to provide input data to be consumed by the third job, and an output data object to store output data produced by the third job;
based at least on the third job definition, automatically inferring, by the computer system, a second dependency;
wherein the second dependency is the first job on the third job;
wherein the second dependency is automatically inferred based at least in part on automatically determining that the source data object specified in the first job definition is the output data object specified in the third job definition; and
based at least in part on the automatically inferring the first dependency and the automatically inferring the second dependency, dispatching, by the computer system, a second plurality of job instances for execution, wherein the dispatching the second plurality of job instances is controlled such that a second instance of the first job, of the second plurality of job instances, is blocked from being dispatched until after both: (a) a second instance of the second job, of the second plurality of job instances, completes, and (b) a first instance of the third job, of the second plurality of job instances, completes.

12. The computer system of claim 11 wherein at least one job definition of the plurality of job definitions specifies whether a dependency on the source data object, of the at least one job definition, is an interval dependency such that the source data object, of the at least one job definition, contains data associated with a specified time interval or a snapshot dependency such that the source data object, of the at least one job definition, contains a snapshot of data reflective of a current condition at a specified snapshot time.

13. The computer system of claim 11 wherein at least one job definition of the plurality of job definitions specifies whether the output data object comprises a snapshot of data or data for a time interval.

14. The computer system of claim 11 wherein at least one job definition of the plurality of job definitions specifies that the output data object comprises data for a time interval, the at least one job definition of the plurality of job definitions further specifies a duration of the time interval.

15. The computer system of claim 11, wherein a database job definition, of the plurality of job definitions, of a database job, of the plurality of jobs, specifies the source data object to provide input data to be consumed by the database job, as part of a database query.

\* \* \* \* \*